United States Patent
Kuwabara

(10) Patent No.: US 9,666,211 B2
(45) Date of Patent: May 30, 2017

(54) INFORMATION PROCESSING APPARATUS, INFORMATION PROCESSING METHOD, DISPLAY CONTROL APPARATUS, AND DISPLAY CONTROL METHOD

(71) Applicant: SONY CORPORATION, Minato-ku (JP)

(72) Inventor: Takashi Kuwabara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 351 days.

(21) Appl. No.: 13/911,323

(22) Filed: Jun. 6, 2013

(65) Prior Publication Data

US 2014/0019132 A1 Jan. 16, 2014

(30) Foreign Application Priority Data

Jul. 12, 2012 (JP) ................................ 2012-156201

(51) Int. Cl.
| | | |
|---|---|---|
| *G10L 25/48* | (2013.01) | |
| *H04N 5/93* | (2006.01) | |
| *G10L 25/57* | (2013.01) | |
| *G10L 15/04* | (2013.01) | |

(52) U.S. Cl.
CPC .............. *G10L 25/48* (2013.01); *G10L 25/57* (2013.01); *H04N 5/93* (2013.01); *G10L 15/04* (2013.01)

(58) Field of Classification Search
None
See application file for complete search history.

(56) References Cited

U.S. PATENT DOCUMENTS

| | | | | |
|---|---|---|---|---|
| 7,599,554 B2* | 10/2009 | Agnihotri | ......... | G06F 17/30793 382/173 |
| 2002/0028060 A1* | 3/2002 | Murata | ................ | G11B 27/028 386/282 |
| 2007/0011012 A1* | 1/2007 | Yurick | .................... | G10L 15/26 704/277 |
| 2008/0235763 A1* | 9/2008 | Krantz | ................... | G11B 27/34 726/2 |
| 2008/0240379 A1* | 10/2008 | Maislos | ............ | G06F 17/30855 379/88.13 |
| 2009/0318777 A1* | 12/2009 | Kameyama | .............. | A61B 5/16 600/301 |
| 2010/0100382 A1* | 4/2010 | Rao | .......... | G10L 25/78 704/254 |
| 2011/0317984 A1* | 12/2011 | Masutani | ............. | H04N 9/8205 386/285 |
| 2012/0130711 A1* | 5/2012 | Yamabe | .................. | G10L 25/78 704/231 |
| 2012/0268364 A1* | 10/2012 | Minnen | ................... | G06F 3/017 345/156 |
| 2013/0132078 A1* | 5/2013 | Arakawa | ................. | G10L 25/78 704/233 |

* cited by examiner

*Primary Examiner* — Huyen Vo
*Assistant Examiner* — Yi-Sheng Wang
(74) *Attorney, Agent, or Firm* — Chip Law Group

(57) ABSTRACT

There is provided an information processing apparatus including an information acquiring unit that acquires information to identify an editing point of content including a voice, on the basis of language analysis of the content, and an information output unit that outputs the acquired information.

17 Claims, 21 Drawing Sheets

FIG. 4

(a) CONTENT ASSOCIATION STRUCTURE

```
struct CONTENT ASSOCIATION STRUCTURE {
    ID TO IDENTIFY ASSOCIATION CONTENT
    ANALYSIS CHARACTER STRING LIST
}
```

(b) CHARACTER STRING STRUCTURE

```
struct CHARACTER STRING STRUCTURE
{
    "XXXXAAAAACCCCCCBBBBB"    // CHARACTER STRING
    START TIME                // TIME WHEN PRONUNCIATION OF CHARACTER STRING STARTS
    END TIME                  // TIME WHEN PRONUNCIATION OF CHARACTER STRING ENDS
    struct{
        START CHARACTER POSITION    // BREAKPOINT POSITION OF CHARACTER STRING
        START TIME                  // TIME POSITION OF BREAKPOINT POSITION
        PRONUNCIATION INFORMATION   // TYPE OF VOICE FEATURE
    } split[n]
}
```

FIG. 17

```
struct {
ID TO IDENTIFY ASSOCIATION CONTENT
REFERENCE TEXT          // WORD PRONOUNCED IN SECTION
START TIME              // START TIME POSITION OF BREAKPOINT POSITION
DURATION TIME           // DURATION TIME OF BREAKPOINT POSITION
PRONUNCIATION INFORMATION // TYPE OF VOICE FEATURE
  }
```

(a) CONTENT ASSOCIATION STRUCTURE

```
struct CONTENT ASSOCIATION STRUCTURE{
    ID TO IDENTIFY ASSOCIATION CONTENT
    ANALYSIS INFORMATION LIST
}
```

(b) ANALYSIS INFORMATION STRUCTURE

```
struct ANALYSIS INFORMATION STRUCTURE
{
    STRUCTURE TYPE   // MOVEMENT STRUCTURE OR CHARACTER STRING STRUCTURE
    START TIME
    END TIME
}
```

(c) MOVEMENT STRUCTURE

```
struct MOVEMENT STRUCTURE
{
    ANALYSIS INFORMATION STRUCTURE
        MOVEMENT TYPE
}
```

(d) CHARACTER STRING STRUCTURE

```
struct CHARACTER STRING STRUCTURE
{
    ANALYSIS INFORMATION STRUCTURE
    "XXXXAAAAACCCCCCBBBBB"  // CHARACTER STRING
    struct{
        START CHARACTER POSITION    // BREAKPOINT POSITION OF CHARACTER STRING
        START TIME                  // START TIME POSITION OF BREAKPOINT POSITION
        PRONUNCIATION INFORMATION   // TYPE OF VOICE FEATURE
    } split[n]
}
```

INFORMATION PROCESSING APPARATUS, INFORMATION PROCESSING METHOD, DISPLAY CONTROL APPARATUS, AND DISPLAY CONTROL METHOD

BACKGROUND

The present disclosure relates to an information processing apparatus, an information processing method, a display control apparatus, and a display control method and more particularly, to an information processing apparatus that processes content including a voice.

In the related art, a method of extracting only partial content considered as interesting content from a content group by considering and analogizing the tastes of users and reproducing the content has been known. In a method of identifying a portion of content by which all people are amused, an amount of content to be extracted decreases. For this reason, it is necessary to make up for the insufficient content to use the content for a slide show. When the tastes of the users are considered, how to construct a database to identify the tastes of the users causes a problem.

For example, technology for automatically generating a chapter from content including speeches and reproducing the chapter has been suggested in WO2009/025155. According to this technology, a lump of a voice is determined from waveform analysis of a sound, a chapter jump is executed in a lump unit of the voice, and content is viewed. Further, technology for automatically determining an editing point from sound analysis has been suggested in JP H10-84526A. According to this technology, when a silent section is continued for a constant time, the silent section is stored as an editing point and cut editing is performed at the time of the following editing.

SUMMARY

However, according to the technology suggested in WO2009/025155, an unnecessary section may not be identified in hearing the content of the speech and it is not possible to cut only a meaningful portion of the content and reproduce the portion. Because the lump of the voice is determined by the amplitude of the sound, a section in which the ending of a word has been dull may not be determined.

According to the technology suggested in JP H10-84526A, an excessively long silent section that is considered as a redundant section generated at the time of a conversation or a speech can be identified. However, it is not possible to identify a section of sounds other than the voice or a section of meaningless sounds of the voice in hearing the content of the conversation or the speech. Generally, it is requested to develop a method of determining a meaningful section and a meaningless section in sections in which the voice is detected, to minimize the meaningless section in the middle of the conversation.

It is desirable to provide superior information to identify an editing point.

According to an embodiment of the present disclosure, there is provided an information processing apparatus including an information acquiring unit that acquires information to identify an editing point of content including a voice, on the basis of language analysis of the content, and an information output unit that outputs the acquired information.

In the present disclosure, the information acquiring unit acquires the information to identify the editing point of the content, on the basis of the language analysis of the content including the voice. For example, the information to identify the editing point may include language information obtained by the language analysis in a surrounding section of the editing point. In this case, the language information may include pronunciation information of the voice.

The information to identify the editing point of the acquired content is output by the information output unit. For example, the information output unit may record the acquired information on a recording medium in association with the content. Further, the information output unit may transmit the acquired information to a network in a transmission unit of the content.

As such, in the present disclosure, it is possible to provide information to identify an editing point of content including a voice, the information being acquired on the basis of language analysis of the content and output.

In the present disclosure, the information output unit may output movement information of video included in the content in a surrounding section of the editing point. As such, if the movement information of the video is output, useful information can be provided as the information to identify the editing point.

According to another embodiment of the present disclosure, there is provided a display control apparatus including an information acquiring unit that acquires information to identify an editing point of content including a voice, is the editing point being obtained on the basis of language analysis of the content, and a display control unit that controls display relating to the content, on the basis of the acquired information.

In the present disclosure, the information acquiring unit acquires the information to identify the editing point of the content, which is obtained on the basis of the language analysis of the content including the voice. For example, the information to identify the editing point may include language information obtained by the language analysis in a surrounding section of the editing point. In this case, the language information may include pronunciation information of the voice and character string information of the voice. In addition, the display relating to the content is controlled by the display control unit, on the basis of the acquired information.

For example, the display control unit may identify a first section of the content having a high useful degree and a second section of the content having a low useful degree, on the basis of the information to identify the editing point. The display control unit may perform control in a manner that a timeline of the content is displayed in a state in which the first section and the second section are distinguishable.

In this case, the display control unit may perform control in a manner that a character string corresponding to a voice of a predetermined section of the timeline is displayed, using character string information included in the language information, according to selection of the predetermined section of the timeline. At this time, the display control unit may perform control in a manner that the character string corresponding to the voice of the predetermined section and character strings corresponding to voices of sections before and after the predetermined section are displayed and the character string corresponding to the voice of the predetermined section is highlighted and displayed. In this case, the highlight display may have display colors different from display colors of other sections.

For example, the display control unit may perform control in a manner that a timeline of the content divided by a section for a clause shown by character string information included in the language information is displayed and a character string corresponding to a voice of each section of the timeline is displayed to correspond to the section of the timeline.

As such, in the present disclosure, the display relating to the content is controlled on the basis of the information to identify the editing point of the content that is obtained on the basis of the language analysis of the content including the voice. Therefore, the display relating to the content, for example, the display of the timeline for editing can be appropriately performed.

According to the embodiments of the present disclosure described above, superior information to identify an editing point can be provided.

BRIEF DESCRIPTION OF THE DRAWINGS

FIG. 4 is a diagram illustrating a content association structure and a character string structure generated by a language analysis result recording format converting unit;

FIG. 17 is a diagram illustrating an example of a content association structure when network transmission is performed;

FIG. 19 is a diagram illustrating a content association structure generated by an analysis information integrating unit and a character string structure and a movement structure included in the content association structure;

DETAILED DESCRIPTION OF THE EMBODIMENT(S)

Figure 1:
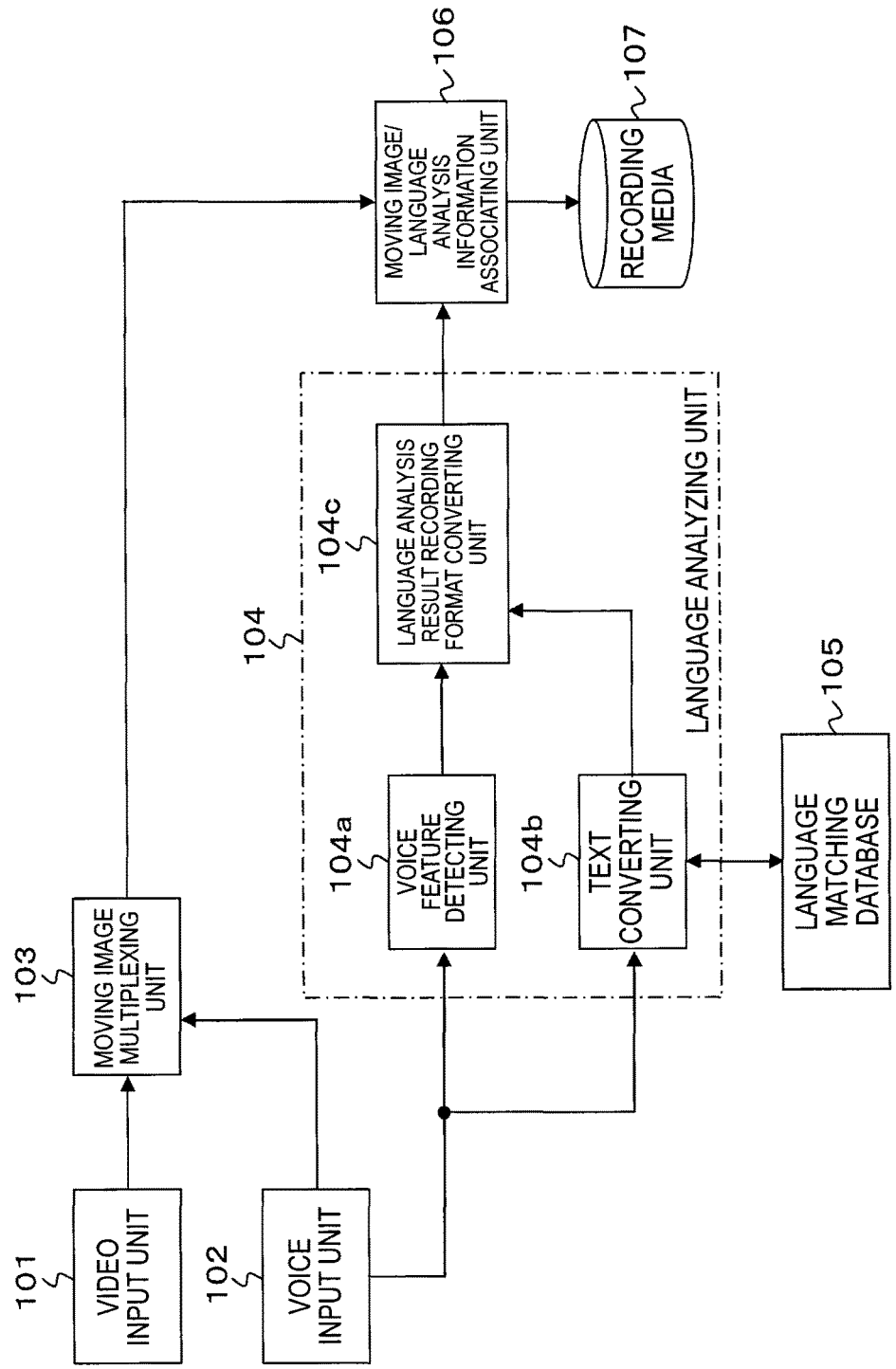
FIG. 1 is a block diagram illustrating a configuration example of an information processing apparatus according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.
1. Embodiment
2. Modifications 1. Embodiment Configuration Example of Information Processing Apparatus FIG. 1 illustrates a configuration example of an information processing apparatus 10. The information processing apparatus 10 includes a video input unit 101, a voice input unit 102, a moving image multiplexing unit 103, a language analyzing unit 104, a language matching database 105, a moving image/language analysis information associating unit 106, and recording media 107.

The video input unit 101 inputs video data that forms content. The voice input unit 102 inputs voice data that corresponds to the video data input to the video input unit 101 and forms content. The moving image multiplexing unit 103 multiplexes the video data input to the video input unit 101 and the voice data input to the voice input unit 102 and generates multiplexing data.

The language analyzing unit 104 has a voice feature detecting unit 104a, a text converting unit 104b, and a language analysis result recording format converting unit 104c. The voice feature detecting unit 104a analyzes the voice data input to the voice input unit 102 and detects a voice feature section (split). The voice feature detecting unit 104a outputs pronunciation information showing a type of a voice feature and time information of a start and an end, whenever the voice feature detecting unit 104a detects the voice feature section.

The voice feature section includes (a) a long sound section (for example, ee, ea, and the like) of a vowel, (b) a section beginning with a plosive or a strong accent, (c) an expression section of an imitative sound, and (d) a change section of a pitch of a voice. The long sound section of the vowel of (a) is likely to be a relatively meaningless section while talking and is a section which a user desires to cut at the time of editing. The section beginning with the plosive or the strong accent of (b) is a section which a talking person desires to emphasize or is surprised at and the user desires to adopt at the time of editing.

The expression section of the imitative sound of (c) is a section in which a talking person desires to explain something, but may not remember appropriate words, or desires to emphasize the something and which the user desires to adopt at the time of editing. In the change section of the pitch of the voice of (d), a change section from a high pitch to a low pitch is mainly a more explanatory part and a change section from a low pitch to a high pitch is mainly an emotionally expressed section. Both the change section from the high sound to the low sound and the change section from the high sound to the low sound are sections which the user desires to adopt at the time of editing.

Figure 2:
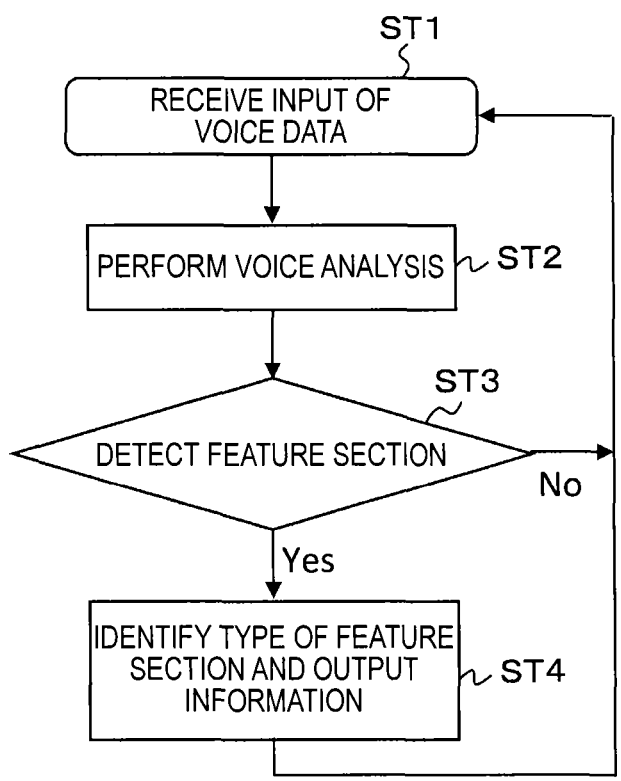
FIG. 2 is a flowchart illustrating an example of a processing sequence of a voice feature detecting unit.

A flowchart of FIG. 2 illustrates an example of a processing sequence of the voice feature detecting unit 104a. First, in step ST1, the voice feature detecting unit 104a receives an input of the voice data. Next, in step ST2, the voice feature detecting unit 104a performs the voice analysis. Next, in step ST3, the voice feature detecting unit 104a determines whether the voice feature section advances from the start to the end of the voice feature section, that is, the voice feature section is detected.

When the voice feature section is not detected, the voice feature detecting unit 104a returns to step ST1 and repeats the same processing as the processing described above. Meanwhile, when the voice feature section is detected, in step ST4, the voice feature detecting unit 104a identifies a type of the voice feature section and outputs type information and time information of the start and the end of the voice feature section as information of the detected voice feature section. Then, the voice feature detecting unit 104a returns to step ST1 and proceeds to detection processing of a next voice feature section.

The text converting unit 104b performs the language analysis on the voice data input to the voice input unit 102 using the language matching database 105 and extracts a character string for each sentence included in each chapter of the moving image, for each chapter of the moving image. The text converting unit 104b outputs character string data and time information of the start and the end, whenever the character string is detected.

Figure 3:
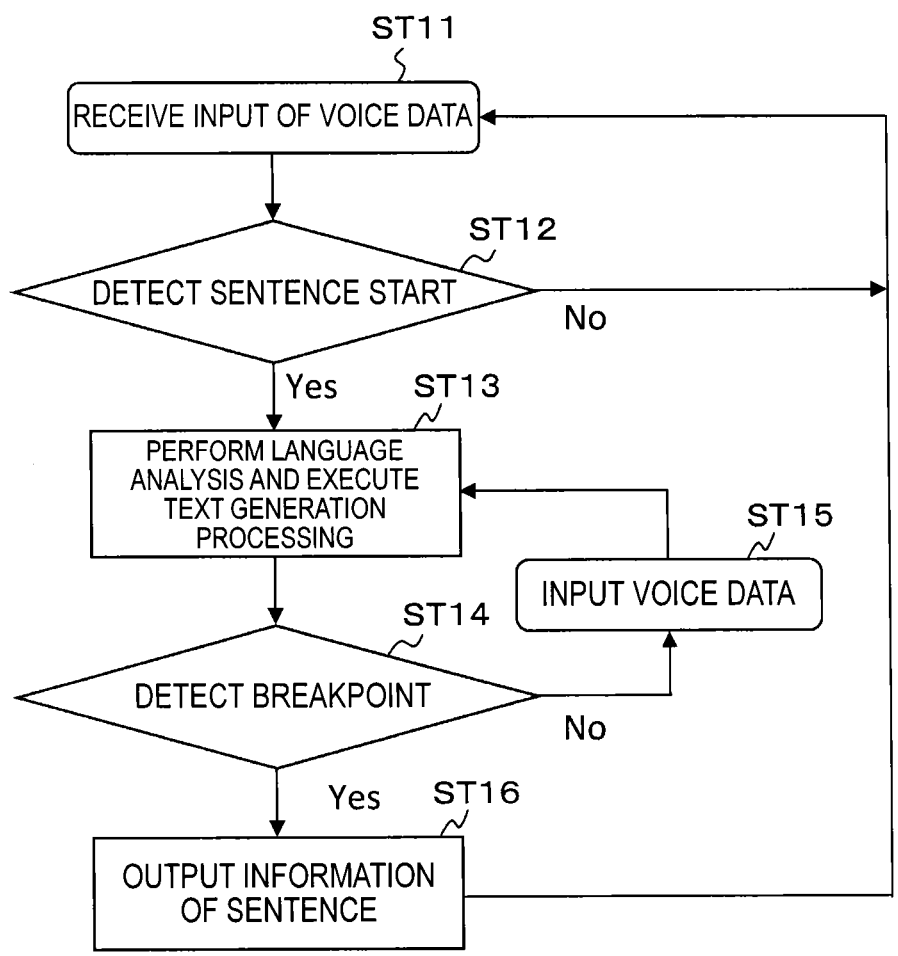
FIG. 3 is a flowchart illustrating an example of a processing sequence of a text converting unit.

A flowchart of FIG. 3 illustrates an example of a processing sequence of the text converting unit 104b. First, in step ST11, the text converting unit 104b receives an input of the voice data. Next, in step ST12, the text converting unit 104b determines whether a conversation starts, that is, a sentence starts. When the sentence does not start, the text converting unit 104b returns to step ST11 and repeats the same processing as the processing described above.

When the sentence starts, in step ST13, the text converting unit 104b performs the language analysis on the voice data and executes text generation processing. Next, in step ST14, the text converting unit 104b determines whether a breakpoint of the sentence (breakpoint of the voice) is detected. When the breakpoint is not detected, the text converting unit 104b inputs the voice data in step ST15 and performs the language analysis and executes the text generation processing in step ST13, until the breakpoint is detected.

When the breakpoint of the sentence is detected, in step ST16, the text converting unit 104b outputs the information of the sentence, that is, the character string data and the time information of the start and the end. Then, the text converting unit 104b returns to step ST11 and executes the text generation processing based on the language analysis of a next sentence.

Returning to FIG. 1, the language analysis result recording format converting unit 104c converts formats of the information of each voice feature section from the voice feature detecting unit 104a and the information of each sentence from the text converting unit 104b into a recording format.

In this case, the language analysis result recording format converting unit 104c generates a content association structure illustrated in FIG. 4(a), for each chapter. An "ID to identify association content" is chapter identification information of the content. A character string structure (illustrated in FIG. 4(b)) of each sentence that is included in the chapter is included in a portion of an "analysis character string list".

The character string structure includes character string data (data of XXXXAAAAACCCCCBBBBB in an example of FIG. 4(b)) of a sentence and information of a start time and an end time of a corresponding character string. In this case, the start time shows a time when the pronunciation of the character string starts and the end time shows a time when the pronunciation of the character string ends. The start time and the end time show a correspondence relation of video data and voice data forming the content. That is, the start time and the end time show which section of the content the character string corresponds to and become necessary for cutting at the time of editing.

The character string structure includes information of each voice feature section (split) in a sentence. Information of one voice feature section includes a start character position, a start time, and pronunciation information. The start character position shows a breakpoint position of a character string. The start character position is described in a form of what number position of the character string to make the character string and the voice feature section to correspond to each other. In the example of FIG. 4(b), a start character position in a voice feature section that corresponds to "AAAA" of the character string is a position of a fifth character.

The start time shows a time of a breakpoint position and shows a correspondence relation of the video data and the voice data forming the content. The pronunciation information shows a type of a voice feature. The type of the voice feature includes the long sound section of the vowel, the section beginning with the plosive or the strong accent, the expression section of the imitative sound, and the change section of the pitch of the voice, as described above.

Figure 5:
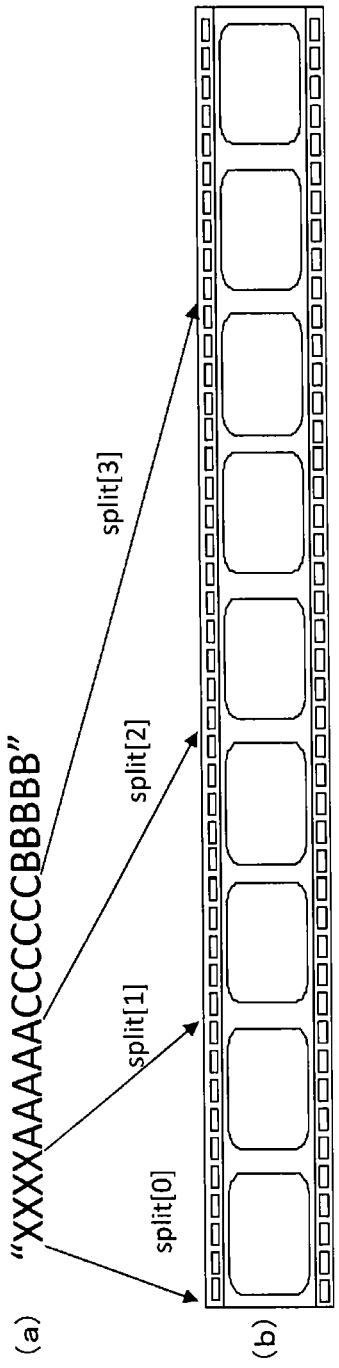
FIG. 5 is a schematic diagram illustrating an example of a correspondence relation of a character string, a voice feature section (split), and video data (content)

FIG. 5 schematically illustrates an example of a correspondence relation of a character string, a voice feature section (split), and video data (content). FIG. 5(a) illustrates the character string and FIG. 5(b) schematically illustrates each frame of the video data with a film format. In this example, four voice feature sections (splits) of "split [0]" to "split [3]" are included in a character string of "XXXX-AAAAACCCCCBBBBB".

Returning to FIG. 1, the moving image/language analysis information associating unit 106 associates the multiplexing data of the video data and the voice data obtained by the moving image multiplexing unit 103 and the content association structure obtained by the language analyzing unit 104 with each other and records the multiplexing data and the content association structure on the recording media 107. In this case, the association can be performed by recording the multiplexing data and the content association structure on the recording media with the following formats of (a) to (d).

(a) A content association structure (refer to FIG. 4) corresponding to multiplexing data of a chapter is added to an ending of the multiplexing data and the multiplexing data and the content association structure are recorded, for each chapter. (b) Multiplexing data of a chapter and a content association structure corresponding to the multiplexing data are recorded with the same file names and different extensions, for each chapter. (c) Multiplexing data of a chapter and a content association structure corresponding to the multiplexing data are recorded with any file names, but a separate database to associate the multiplexing data and the content association structure with each other is generated, for each chapter.

(d) Multiplexing data of a chapter and a content association structure corresponding to the multiplexing data are recorded with any file names, but information to identify the corresponding multiplexing data, for example, a universally unique identifier (UUID) is embedded in the content association structure of the chapter, for each chapter.

Next, an operation of the information processing apparatus 10 illustrated in FIG. 1 will be described. The video data that is input to the video input unit 101 is supplies to the moving image multiplexing unit 103. In addition, the voice data that is input to the voice input unit 102 is supplied to the moving image multiplexing unit 103. In the moving image multiplexing unit 103, the video data and the voice data are multiplexed and the multiplexing data is obtained.

The voice data that is input to the voice data input unit 102 is supplied to the voice feature detecting unit 104a and the text converting unit 104b of the language analyzing unit 104. In the voice feature detecting unit 104a, the voice data is analyzed and the voice feature section (split) is detected. In the voice feature detecting unit, the pronunciation information showing the type of the voice feature section and the time information of the start and the end are output whenever the voice feature section is detected.

The text converting unit 104b performs the language analysis on the voice data using the language matching database 105 and detects the character string for each sentence included in each chapter, for each chapter of the moving image. The text converting unit 104b outputs the character string data and the time information of the start and the end, whenever the character string for each sentence is detected.

In the language analyzing unit 104, the output information of the voice feature detecting unit 104a and the output information of the text converting unit 104b are supplied to the language analysis result recording format converting unit 104c. In the format converting unit 104c, the formats of the information of each voice feature section from the voice feature detecting unit 104a and the information of each sentence from the text converting unit 104b are converted into the recording format.

That is, in the format converting unit 104c, the content association structure is generated for each chapter (refer to FIG. 4(a)). In the content association structure, the character string structure of each sentence included in the chapter is included (refer to FIG. 4(b)). The character string structure includes the character string data of the sentence and the information of the start time and the end time of the character string. The character string structure includes the information of each voice feature section (split) in the sentence. In this case, the information of one voice feature section includes the start character position, the start time, and the pronunciation information.

The multiplexing data of the video data and the voice data obtained by the moving image multiplexing unit 103 is supplied to the moving image/language analysis information associating unit 106. The information (content association structure) of each sentence which is obtained by the language analyzing unit 104 and of which the format is converted into the recording format is supplied to the moving image/language analysis information associating unit 106. In the moving image/language analysis information associating unit 106, the information of each sentence is associated with the multiplexing data of the video data and the voice data and the information and the multiplexing data are recorded on the recording media 107.

As described above, in the information processing apparatus 10 illustrated in FIG. 1, the language analysis is performed on the voice data forming the content and the content association structure is generated for each chapter. The content association structure includes the information of the voice feature section (split) based on the analysis of the voice data and the character string data based on the text conversion. The multiplexing data of the video data and the voice data forming the content and the content association structure are associated with each other and are recorded on the recording media 107. Therefore, superior information to identify an editing point can be provided.

[Configuration Example of Editing Apparatus]

Figure 6:
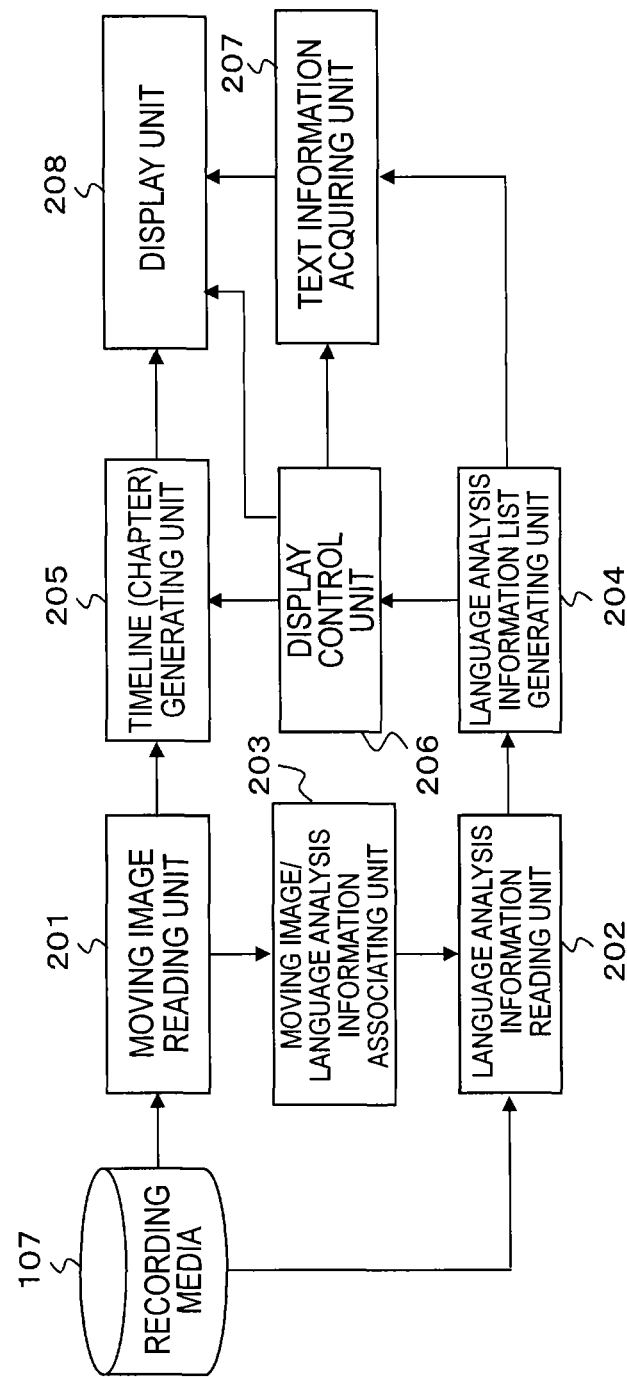
FIG. 6 is a block diagram illustrating a configuration example of an editing apparatus according to an embodiment.

FIG. 6 illustrates a configuration example of an editing apparatus 20. The editing apparatus 20 handles the multiplexing data and the content association structure of each chapter recorded on the recording media 107 by the information processing apparatus 10 illustrated in FIG. 1. The editing apparatus 20 includes a moving image reading unit 201, a language analysis information reading unit 202, a moving image/language analysis information associating unit 203, and a language analysis information list generating unit 204. The editing apparatus 20 further includes a timeline (chapter) generating unit 205, a display control unit 206, a text information acquiring unit 207, and a display unit 208.

The moving image reading unit 201 reads multiplexing data of video data and voice data of a predetermined chapter relating to editing, from the recording media 107. The language analysis information reading unit 202 reads a content association structure (refer to FIG. 4) corresponding to the multiplexing data of the video data and the voice data of the predetermined chapter read by the moving image reading unit 201, from the recording media 107. At this time, the moving image/language analysis information associating unit 203 transmits association information such as identification information or file information of the chapter to the language analysis information reading unit 202.

The language analysis information list generating unit 204 receives the content association structure read by the language analysis information reading unit 202 and generates a language analysis information list. That is, in the language analysis information list, the character string data, the start time, and the end time for each sentence included in the predetermined chapter are registered. In the language analysis information list, the start character position, the start time, and the pronunciation information of each voice feature section (split) for each sentence are registered.

In the language analysis information list, a level of a useful degree of each voice feature section (split) is determined for each sentence and a section divided by the level of the useful degree, that is, a subchapter is registered. In the registration of the subchapter, identification information of the subchapter and information of a start position and an end position of the subchapter are associated with each other and are stored.

Figure 7:
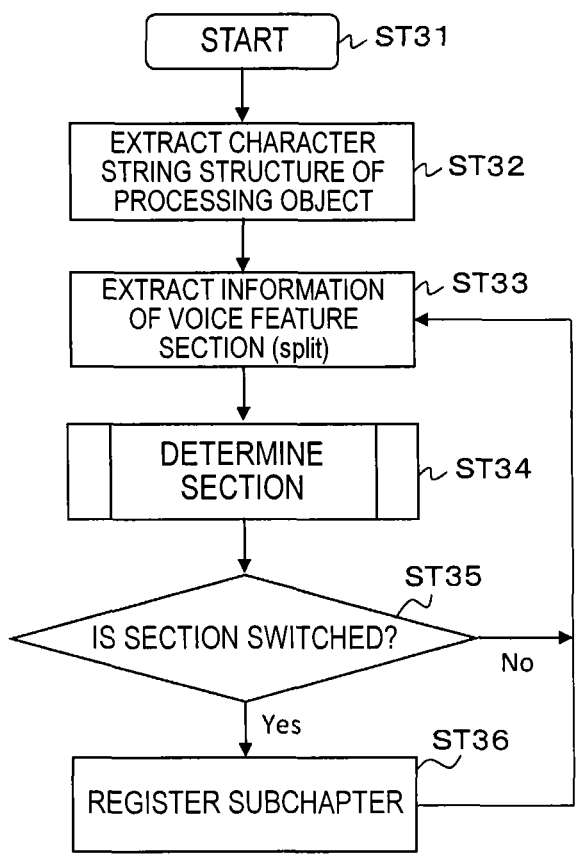
FIG. 7 is a flowchart illustrating an example of a processing sequence of subchapter registration for each sentence in a language analysis information list generating unit.

A flowchart of FIG. 7 illustrates an example of a processing sequence of the subchapter registration for each sentence in the language analysis information list generating unit 204. The language analysis information list generating unit 204 starts processing in step ST31 and then proceeds to step ST32. In step ST32, the language analysis information list generating unit 204 extracts a character string structure of a processing object.

Next, in step ST33, the language analysis information list generating unit 204 extracts information of a first voice feature section (split) as a voice feature section of a processing object. In step ST34, the language analysis information list generating unit 204 determines whether the voice feature section is a section having a high useful degree or a section having a low useful degree.

Next, in step ST35, the language analysis information list generating unit 204 determines whether a section is switched. When the section is not switched, the language analysis information list generating unit 204 returns to step ST33 and extracts information of a next voice feature section (split) as a voice feature section of a processing object. Meanwhile, when the section is switched, in step ST36, the language analysis information list generating unit 204 performs registration of a subchapter with respect to a section before switching.

Then, the language analysis information list generating unit 204 returns to step ST33 and extracts information of a next voice feature section (split) as a voice feature section of a processing object. When there is not the next voice feature section, the language analysis information list generating unit 204 performs the subchapter registration with respect to a section in which the subchapter registration is not performed and ends the processing.

Figure 8:
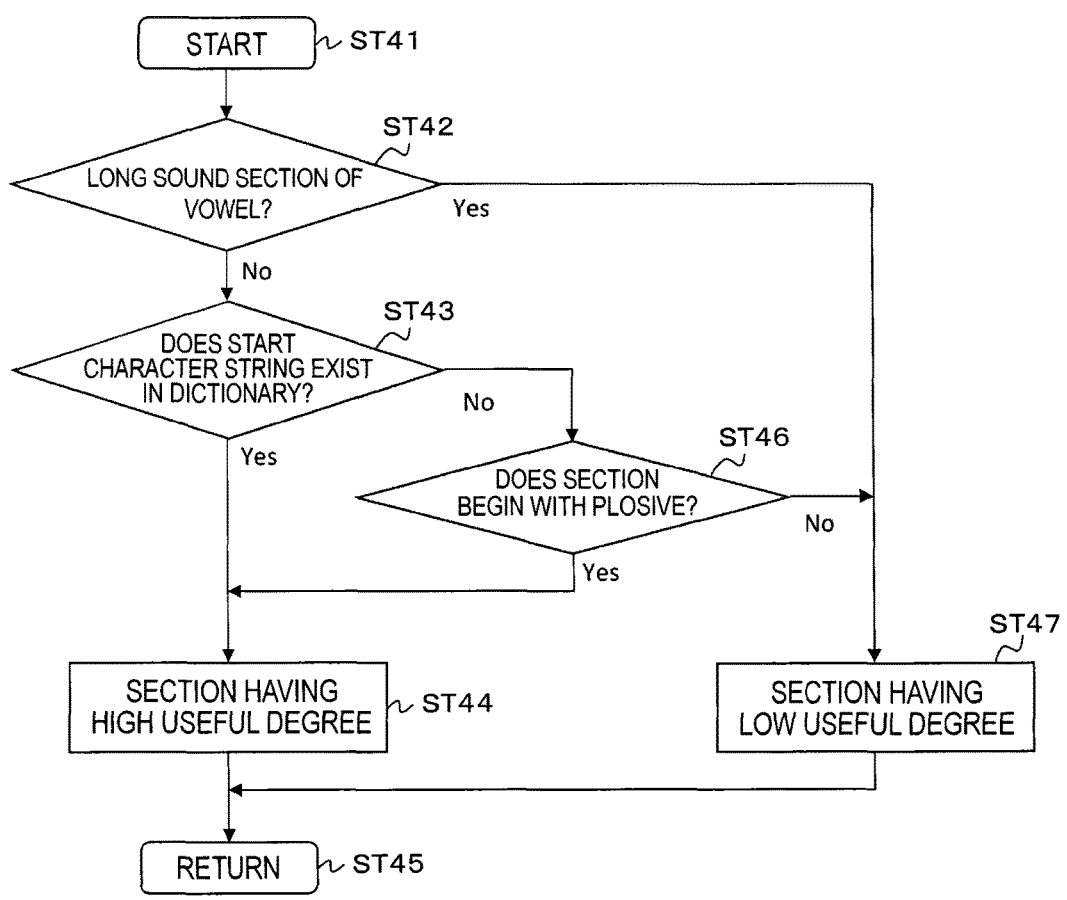
FIG. 8 is a flowchart illustrating an example of a processing sequence to determine a level of a useful degree of a voice feature section.

FIG. 8 illustrates an example of a processing sequence of the section determination of step ST34 in the flowchart of FIG. 7. In step ST41, the language analysis information list generating unit 204 starts processing and then proceeds to step ST42. In step ST42, the language analysis information list generating unit 204 determines whether a voice feature section of a processing object is the long sound section of the vowel.

When the voice feature section of the processing object is not the long sound section of the vowel, in step ST43, the language analysis information list generating unit 204 determines whether a start character string of the voice feature section of the processing object exists in a dictionary. When the start character string exists in the dictionary, in step ST44, the language analysis information list generating unit 204 determines the voice feature section of the processing object as a section having a high useful degree. Then, in step ST45, the language analysis information list generating unit 204 ends the processing.

When it is determined in step ST43 that the start character string does not exist in the dictionary, in step ST46, the language analysis information list generating unit 204 determines whether the voice feature section of the processing object is the section beginning with the plosive. When the voice feature section of the processing object is the section beginning with the plosive, in step ST44, the language analysis information list generating unit 204 determines the voice feature section of the processing object as a section having a high useful degree. Then, in step ST45, the language analysis information list generating unit 204 ends the processing.

When it is determined in step ST42 that the voice feature section of the processing object is the long sound section of the vowel or when it is determined in step ST46 that the voice feature section of the processing object is not the section beginning with the plosive, in step ST47, the language analysis information list generating unit 204 determines the voice feature section of the processing object as a section having a low useful degree. Then, in step ST45, the language analysis information list generating unit 204 ends the processing.

Returning to FIG. 6, the timeline generating unit 205 generates timelines of the video data and the voice data of the predetermined chapter relating to the editing read by the moving image reading unit 201. The generation of the timelines is performed under control from the display control unit 206. The display control unit 206 controls an operation of the timeline generating unit 205, such that the timelines are generated in a state in which a section having a high useful degree and a section having a low useful degree can be distinguished, on the basis of the subchapters registered in the language analysis information list.

The text information acquiring unit 207 acquires the character string data displayed to correspond to the timeline, on the basis of the language analysis information list. The acquisition of the text information is performed under control from the display control unit 206. The display control unit 206 controls an operation of the text information acquiring unit 207, such that the character string data corresponding to the voices of the predetermined subchapter section and the subchapter sections before and after the predetermined subchapter section is acquired, on the basis of the selection information of the predetermined subchapter section of the timeline from the user. The user selects the predetermined subchapter section by operating a pointing device such as a mouse not illustrated in the drawings.

Figure 9:
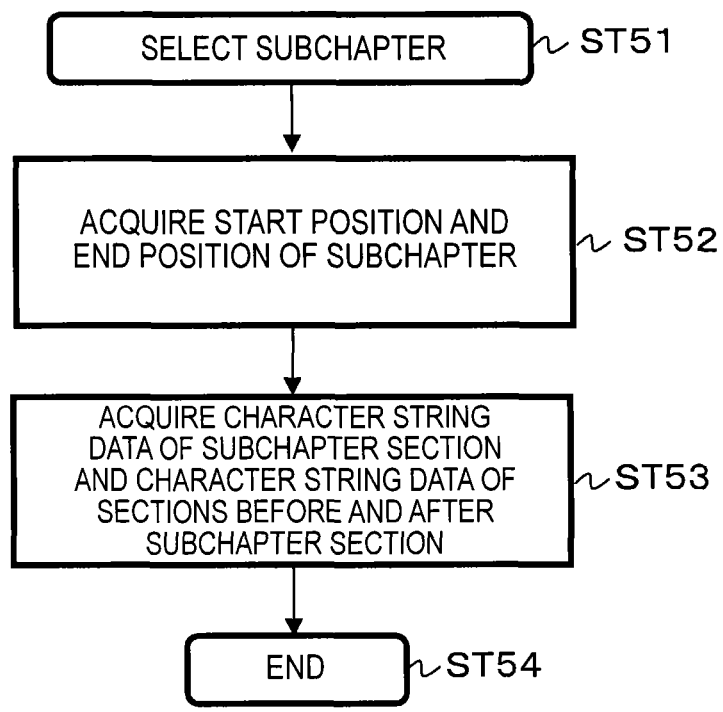
FIG. 9 is a flowchart illustrating an example of a processing sequence of acquisition of character string data in a text information acquiring unit.

A flowchart of FIG. 9 illustrates an example of a processing sequence of the acquisition of the character string data in the text information acquiring unit 207. When selection processing of a subchapter is requested from the user, the text information acquiring unit 207 starts the processing in step ST51.

Next, in step ST52, the text information acquiring unit 207 acquires information of a start position and an end position of the selected subchapter. In this case, the text information acquiring unit 207 acquires the information of the start position and the end position of the subchapter from the language analysis information list generated by the language analysis information list generating unit 204, on the basis of the identification information of the selected subchapter provided from the display control unit 206.

Next, in step ST53, the text information acquiring unit 207 acquires the character string data of the subchapter section and the sections before and after the subchapter section. In this case, the text information acquiring unit 207 refers to the information of the corresponding voice feature section (split) of the language analysis information list, on the basis of the information of the start position and the end position of the subchapter acquired by step ST52, and acquires the necessary character string data.

Returning to FIG. 6, the display unit 208 is configured using a display such as a liquid crystal display (LCD) and displays an editing screen. The display unit 208 displays the timeline generated by the timeline generating unit 205 and the character string acquired by the text information acquiring unit 207, under control from the display control unit 206.

Figure 10:
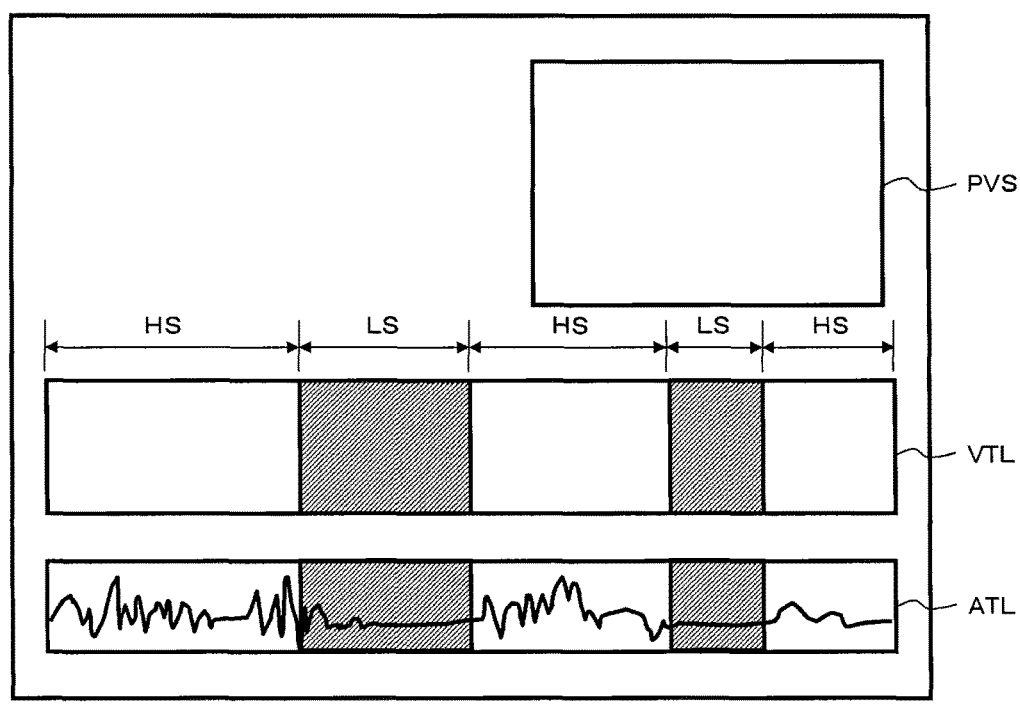
FIG. 10 is a diagram illustrating a display example of an editing screen displayed on a display unit.

FIG. 10 illustrates a display example of the editing screen displayed on the display unit 208. A video timeline VTL and a voice timeline ATL that extend in a horizontal direction are arranged and displayed in a lower portion of the editing screen. A preview screen region PVS is provided in an upper right portion of the editing screen. In the preview screen region, a still image at a position designated by the user on the video timeline VTL or a moving image from the position is displayed. As illustrated in the drawings, the timelines VTL and ATL are displayed in a state in which a subchapter section HS having a high useful degree and a subchapter section LS having a low useful degree can be distinguished by brightness, a color tone, saturation, and a shape.

Figure 11:
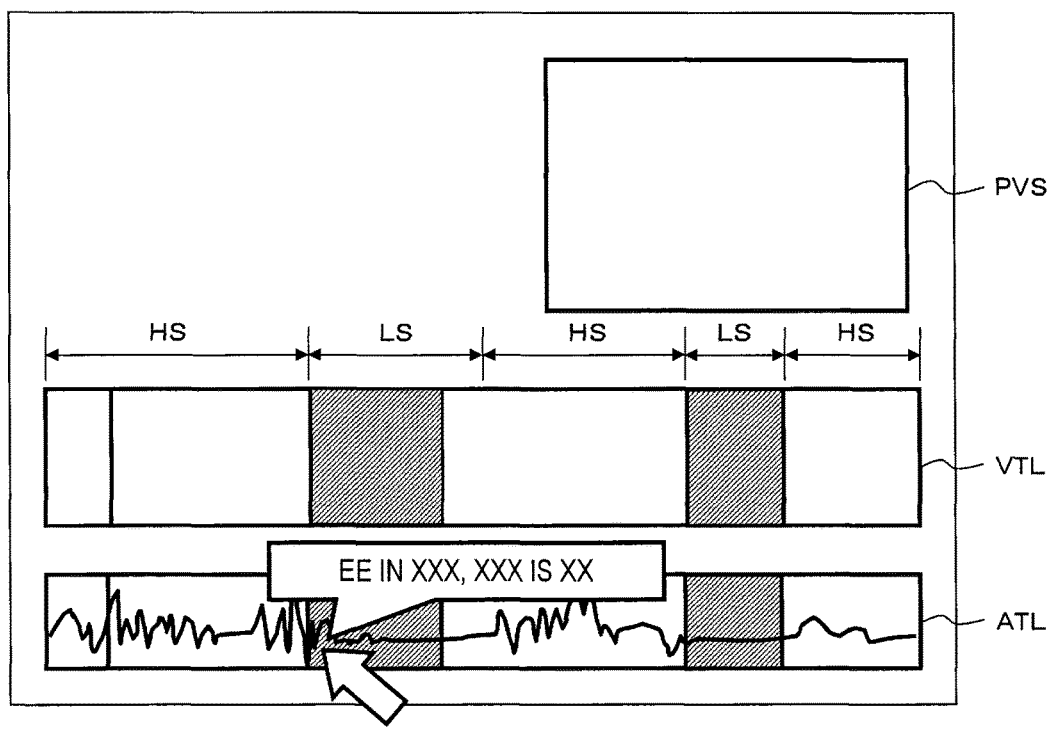
FIG. 11 is a diagram illustrating the case in which character strings corresponding to voices of a predetermined subchapter section of a timeline and sections before and after the predetermined subchapter section are displayed when a user selects the predetermined subchapter section through a mouse operation.

When the user selects the predetermined subchapter section of the timeline by a mouse operation, as illustrated in FIG. 11, the character strings corresponding to the voices of the predetermined subchapter section and the sections before and after the predetermined subchapter section are displayed. In this case, all of the character strings may be displayed in the same state. However, in this embodiment, the character string corresponding to the voice of the predetermined subchapter section is highlighted and displayed, using a method of differently setting a display color of the predetermined subchapter section and display colors of the character strings of the voices of the sections before and after the predetermined subchapter section. Thereby, the character string of the predetermined subchapter section and the character strings of other sections can be easily distinguished visually.

Next, an operation of the editing apparatus 20 illustrated in FIG. 6 will be described. The moving image reading unit 201 reads the multiplexing data of the video data and the voice data of the predetermined chapter relating to the editing, from the recording media 107. The language analysis information reading unit 202 reads the content association structure corresponding to the multiplexing data of the video data and the voice data of the predetermined chapter read by the moving image reading unit 201, from the recording media 107 (refer to FIG. 4).

The content association structure that is read by the language analysis information reading unit 202 is supplied to the language analysis information list generating unit 204. The language analysis information list generating unit 204 generates the language analysis information list, on the basis of the content association structure. In the language analysis information list, the character string data, the start time, and the end time for each sentence included in the predetermined chapter are registered. In the language analysis information list, the start character position, the start time, and the pronunciation information of each voice feature section (split) for each sentence are registered.

In the language analysis information list, a level of a useful degree of each voice feature section (split) is determined for each sentence and a section divided by the level of the useful degree, that is, a subchapter is registered. In the registration of the subchapter, identification information of the subchapter and information of a start position and an end position of the subchapter are associated with each other and are stored.

The video data and the voice data of the predetermined chapter relating to the editing that is read by the moving image reading unit 201 are supplied to the timeline generating unit 205. The timeline generating unit 205 generates the timelines of the video data and the voice data of the predetermined chapter relating to the editing. In this case, the timelines are generated in a state in which a section having a high useful degree and a section having a low useful degree can be distinguished, on the basis of the subchapters registered in the language analysis information list, under the control from the display control unit 206.

The information of the timeline that is generated by the timeline generating unit 205 is supplied to the display unit 208. On the display unit 208, the video timeline VTL and the voice timeline ATL are displayed under the control from the display control unit 206. In this case, the timelines VTL and ATL are displayed in a state in which the section HS having the high useful degree and the section LS having the low useful degree can be distinguished (refer to FIG. 10).

The language analysis information list that is generated by the language analysis information list generating unit 204 is supplied to the text information acquiring unit 207. The identification information of the predetermined subchapter is supplied from the display control unit 206 to the text information acquiring unit 207, according to the selection of the predetermined subchapter section of the timeline from the user.

The text information acquiring unit 207 acquires the character string data corresponding to the voices of the predetermined subchapter section relating to the selection of the user and the subchapter sections before and after the predetermined subchapter section as the character string data displayed to correspond to the timeline, on the basis of the language analysis information list. The character string data is supplied to the display unit 208. On the editing screen of the display unit 208, the character strings corresponding to the voices of the predetermined subchapter section relating to the selection of the user and the subchapter sections before and after the predetermined subchapter section are displayed (refer to FIG. 11).

As described above, in the editing apparatus 20 illustrated in FIG. 6, when the multiplexing data of the video data and the voice data of the predetermined chapter relating to the editing is read from the recording media 107, the content association structure recorded in a state associated with the multiplexing data is read and the language analysis information list is generated. The content association structure includes the information of the voice feature section (split) based on the analysis of the voice data and the character string data based on the text conversion.

When the timeline of the video or the voice is generated on the basis of the multiplexing data, the timeline is generated in a state in which the section having the high useful degree and the section having the low useful degree can be distinguished, on the basis of the subchapters registered in the language analysis information list. For this reason, on the editing screen, the video timeline VTL and the voice timeline ATL are displayed in a state in which the section HS having the high useful degree and the section LS having the low useful degree can be distinguished. Therefore, the user can use a boundary between both the sections as an editing point and perform appropriate editing.

When the user selects the predetermined subchapter by a mouse operation on the timeline, the character string data corresponding to the voices of the predetermined subchapter section relating to the selection of the user and the subchapter sections before and after the predetermined subchapter section is acquired on the basis of the language analysis information list. For this reason, on the editing screen, the character strings corresponding to the voices of the predetermined subchapter section relating to the selection of the user and the subchapter sections before and the after the predetermined subchapter section are displayed. Therefore, the user can recognize content in some degree without reproducing the content and efficiently and effectively perform the editing.

2. Modifications

Another Example of Subchapter Registration

In the embodiment described above, in the language analysis information list generating unit 204 of the editing apparatus 20, the level of the useful degree is determined for each voice feature section (split) and the section divided by the level of the useful degree is registered as the subchapter. On the display unit 208, the timelines of the video and the voice that are divided into the section HS having the high useful degree and the section LS having the low useful degree are displayed.

However, a method of registering each section for each clause, that is, each voice feature section (split) as a subchapter, displaying timelines of video and a voice divided for each clause on the display unit 208, and displaying a character string to correspond to each clause on the display unit 208 is also considered.

Figure 12:
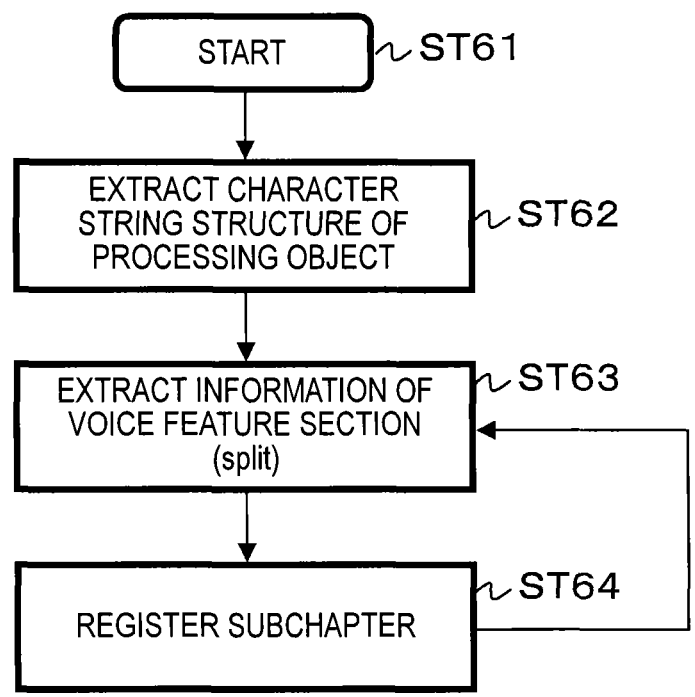
FIG. 12 is a flowchart illustrating an example of a processing sequence of subchapter registration for each sentence in a language analysis information list generating unit.

A flowchart of FIG. 12 illustrates an example of a processing sequence of subchapter registration for each sentence in the language analysis information list generating unit 204 (refer to FIG. 6). The language analysis information list generating unit 204 starts processing in step ST61 and then proceeds to step ST62. In step ST62, the language analysis information list generating unit 204 extracts a character string structure of a sentence of a processing object.

Next, in step ST63, the language analysis information list generating unit 204 extracts information of a first voice feature section (split) included in the character string structure extracted by step ST62. In step ST64, the language analysis information list generating unit 204 registers the voice feature section as the subchapter. In the registration of the subchapter, identification information of the subchapter and information of a start position and an end position of the subchapter are associated with each other and are stored.

Then, the language analysis information list generating unit 204 returns to step ST63 and extracts information of a next voice feature section (split) as a voice feature section of a processing object. When there is not the next voice feature section, the language analysis information list generating unit 204 ends the processing.

In the timeline generating unit 205, when the timelines of the video data and the voice data of the predetermined chapter relating to the editing are generated, the timelines divided for each voice feature section (split) are generated on the basis of the subchapters registered in the language analysis information list. In the text information acquiring unit 207, the character string data corresponding to the voice of each voice feature section (split) is acquired from the language analysis information list.

Figure 13:
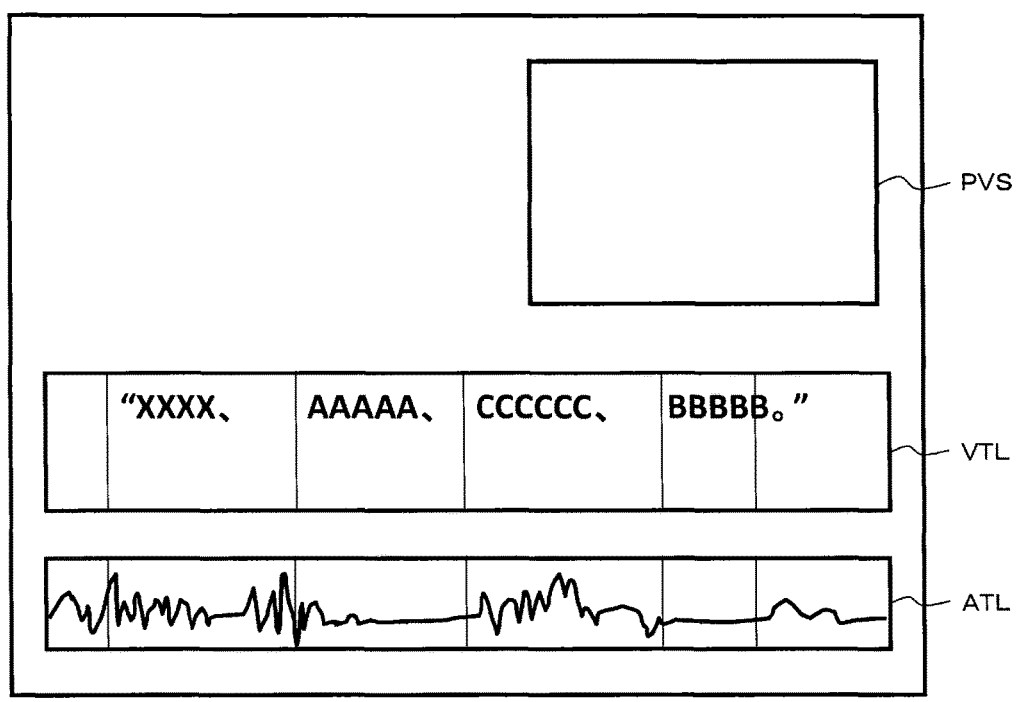
FIG. 13 is a diagram illustrating the case in which a timeline divided for each sound feature section (split) is displayed and a character string corresponding to a voice of each voice feature section is displayed to correspond to each voice feature section.

For this reason, on the display unit 208, the timelines VTL and ATL divided for each voice feature section (split) are displayed by the information of the timelines generated by the timeline generating unit 205, as illustrated in FIG. 13. On the display unit 208, the character string corresponding to the voice of each voice feature section (split) is displayed to correspond to each voice feature section, on the basis of the character string data acquired by the text information acquiring unit 207.

[Video Search System Based on Word Selection]

Although not described above, the editing apparatus 20 can generate a table showing a correspondence relation of words forming the character string and a voice feature section (split) to which the words belong, on the basis of the content association structure of the predetermined chapter relating to the editing read by the language analysis information reading unit 202. A system for searching the video corresponding to the voice feature section (split) where the selected word exists can be configured using the table.

Figure 14:
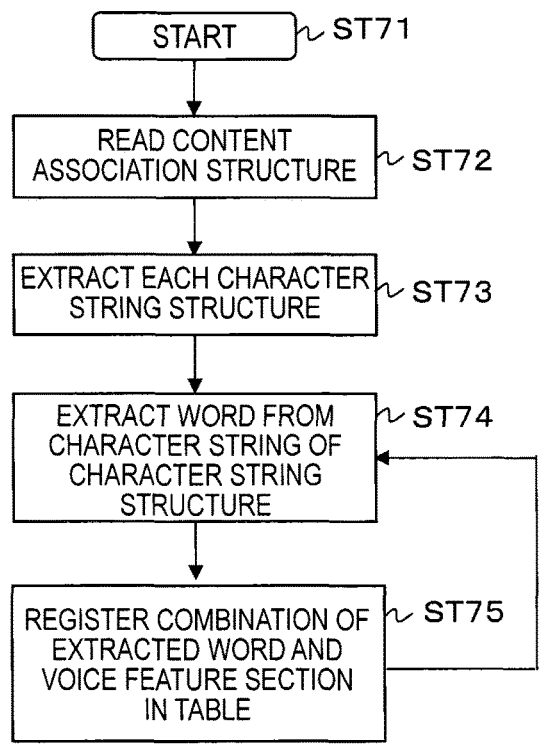
FIG. 14 is a flowchart illustrating an example of a processing sequence of table generation in a table generating unit.

A flowchart of FIG. 14 illustrates an example of a processing sequence of table generation in a table generating unit (not illustrated in FIG. 6). In step ST71, the table generating unit starts processing. Next, in step ST72, the table generating unit reads a content association structure associated with multiplexing data of video data and voice data of a predetermined picture relating to the editing, from the recording media 107 (refer to FIG. 4).

Next, in step ST73, the table generating unit extracts the character string structure corresponding to each character string included in the content association structure. In step ST74, the table generating unit extracts the word from the character string included in each character string structure. In this case, an imitative sound is included as the word. In step ST75, the table generating unit registers a correspondence relation of the word extracted by step ST74 and the voice feature section (split) to which the word belongs in the table.

The word extraction processing of step ST74 and the table registration processing of step ST75 are repetitively executed with respect to all words. When the word extraction processing and the table registration processing with respect to all of the words end, the table generating unit ends the processing.

Figure 15:
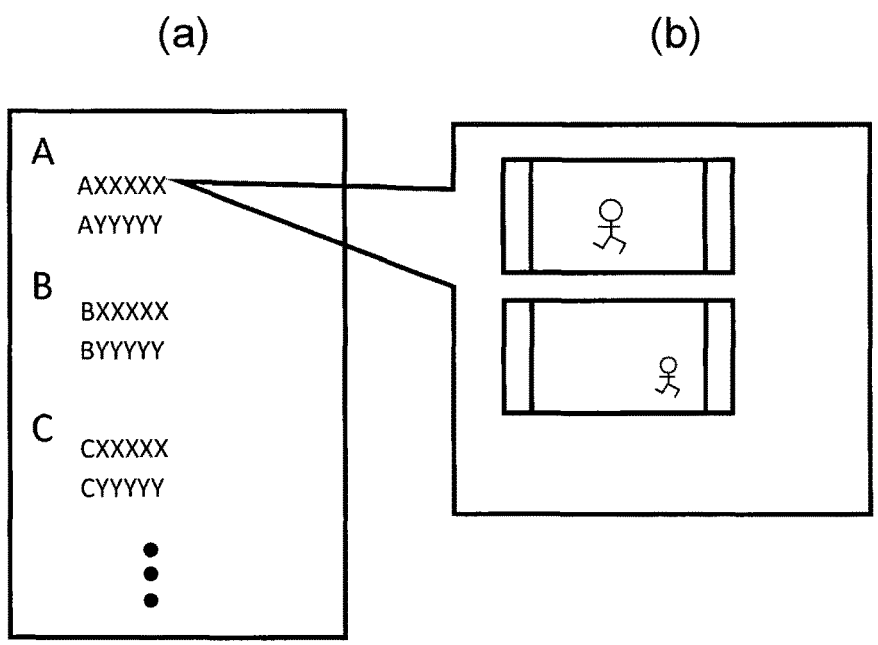
FIG. 15 is a diagram illustrating a video search system based on word selection.

FIG. 15 illustrates a search example using the table generated as described above. For example, on the editing screen displayed on the display unit 208, the words registered in the table are classified like words starting from "A", words starting from "B", . . . and are displayed, as illustrated in FIG. 15(*a*).

When the user selects the predetermined word from the words registered in the table, the table is referred to, the voice feature section (split) to which the predetermined word belongs is acquired, and an image of predetermined frames of the corresponding voice feature section, for example, first and last frames is displayed in the preview screen region PVS of the editing screen, as illustrated in FIG. 15(*b*). A moving image of the corresponding voice feature section may be displayed in the preview screen region PVS. The moving image and the corresponding voice feature section may be shown clearly on the timeline.

[Transmission to Network]

In the embodiment described above, the example of the case in which the moving image/language analysis information associating unit 106 of the information processing apparatus 10 (refer to FIG. 1) associates the multiplexing data of the video data and the voice data forming the content and the language analysis information (content association structure) and records the multiplexing data and the language analysis information on the recording media 107 has been described.

However, when live stream distribution to a network is executed, the multiplexing data of the video data and the voice data forming the content and the language analysis information are associated with each other and are transmitted. In this case, the multiplexing data is transmitted in a transmission unit (buffering unit), for example, 4 sec. However, it is assumed that the language analysis information is also divided by the transmission unit to improve reference performance.

Figure 16:
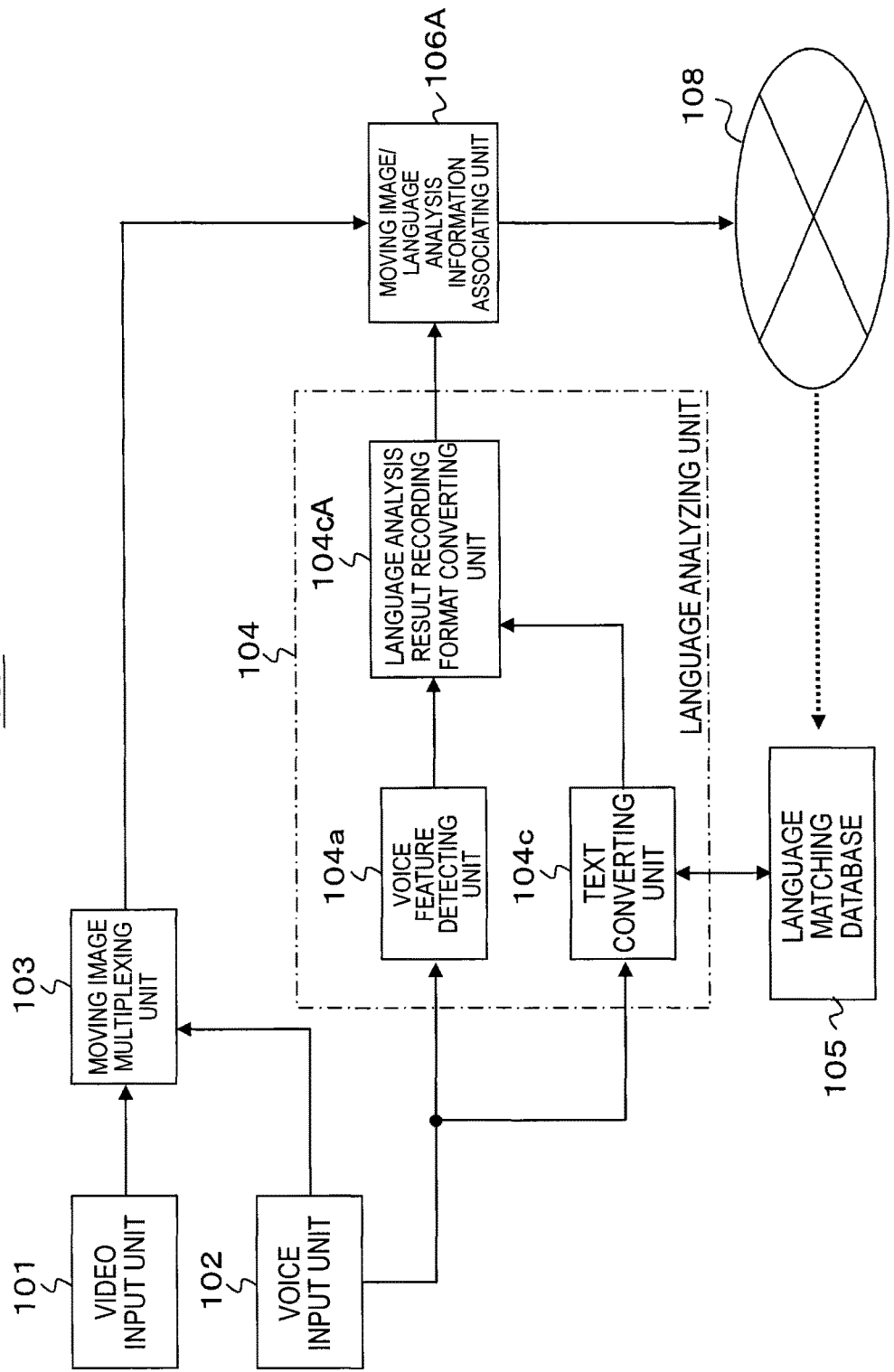
FIG. 16 is a block diagram illustrating a configuration example of an information processing apparatus when live stream distribution to a network is executed.

FIG. 16 illustrates a configuration example of an information processing apparatus 10A when the live stream distribution to the network is executed. In FIG. 16, structural elements corresponding to the structural elements of FIG. 1 are denoted with the same reference numerals and detailed explanation thereof is omitted.

A language analysis result recording format converting unit 104cA of the language analyzing unit 104 generates a content association structure illustrated in FIG. 17, for each transmission unit of the multiplexing data of the video data and the voice data forming the content. An "ID to identify association content" is chapter identification information of the content.

The content association structure includes information such as a "reference text", a "start time", a "duration time", and "pronunciation information". The "reference text" shows character string data of words generated in a transmission unit section. The "start time" shows a start time position of a breakpoint position. The "duration time" shows a duration time of the breakpoint position and shows a time that is equal to or shorter than a longest duration time corresponding to the transmission unit section. The "pronunciation information" shows a type of a voice feature. The type of the voice feature includes the long sound section of the vowel, the section beginning with the plosive or the strong accent, the expression section of the imitative sound, and the change section of the pitch of the voice, as described above.

A moving image/language analysis information associating unit 106A sequentially transmits the multiplexing data obtained by the moving image multiplexing unit 103 to the network 108 in the transmission unit. At this time, for each transmission unit, the moving image/language analysis information associating unit 106A adds a content association structure (refer to FIG. 17) generated by the language analyzing unit 104 to the multiplexing data and transmits the multiplexing data and the content association structure.

In the information processing apparatus 10A illustrated in FIG. 16, the language matching database 105 can use information existing in the network (cloud) 108, as shown by a broken arrow.

[Addition of Movement Analysis Information]

In the embodiment described above, the example of the case in which only the language analysis information is associated with the multiplexing data of the video data and the voice data and the language analysis information and the multiplexing data are recorded or transmitted has been described. However, a method of further associating movement analysis information obtained from the video data with the multiplexing data and recording or transmitting the language analysis information, the movement analysis information, and the multiplexing data is also considered. Thereby, useful information can be provided as information to identify an editing point.

Figure 18:
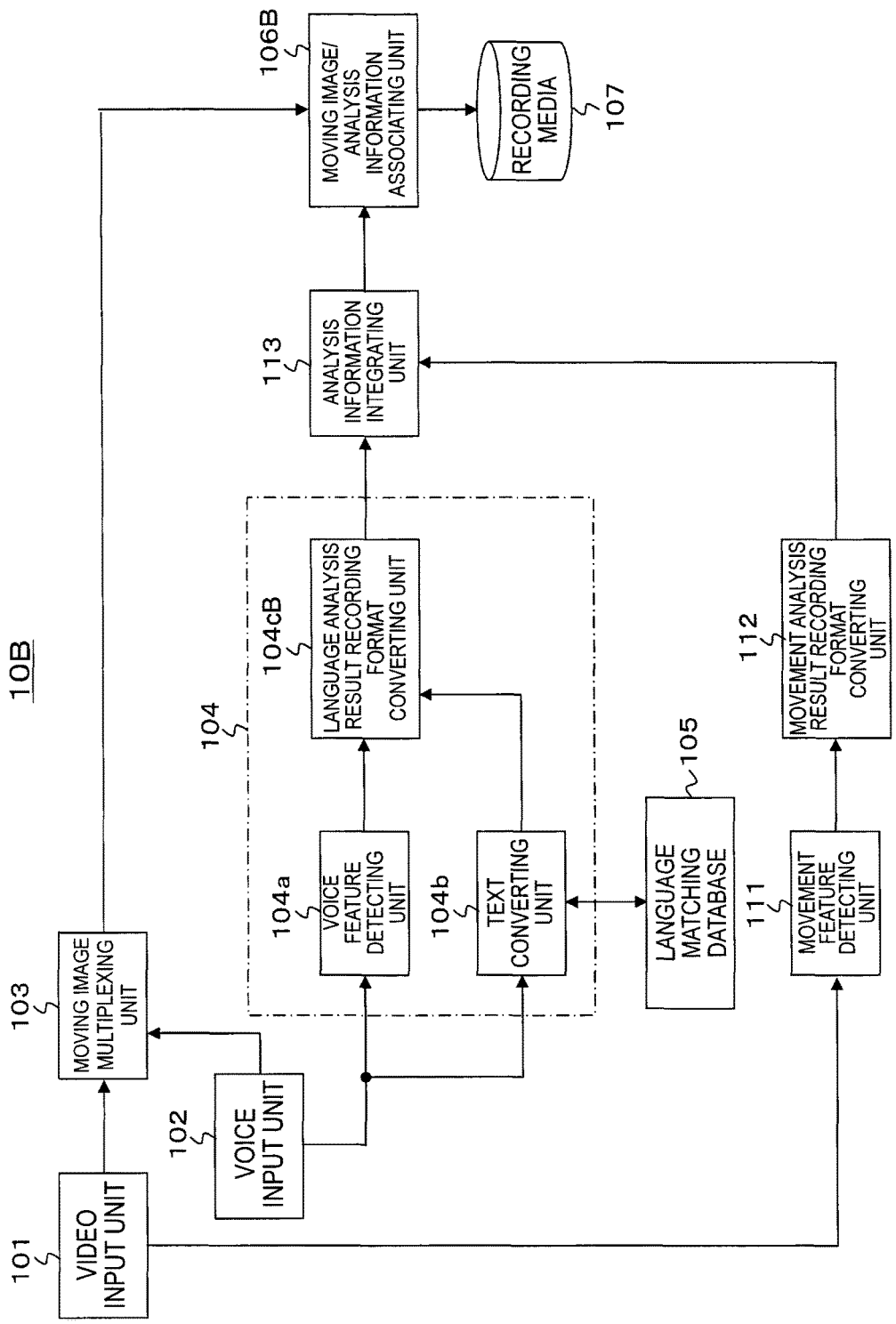
FIG. 18 is a block diagram illustrating another configuration example of an information processing apparatus.

FIG. 18 illustrates a configuration example of an information processing apparatus 10B. In FIG. 18, structural elements corresponding to the structural elements of FIG. 1 are denoted with the same reference numerals and detailed explanation thereof is omitted. The information processing apparatus 10B includes a video input unit 101, a voice input unit 102, a moving image multiplexing unit 103, a language analyzing unit 104, and a language matching database 105. The information processing apparatus 10B further includes a movement feature detecting unit 111, a movement analysis result recoding format converting unit 112, an analysis information integrating unit 113, a moving image/analysis information associating unit 106B, and recording media 107.

The language analyzing unit 104 has a voice feature detecting unit 104a, a text converting unit 104b, and a language analysis result recording format converting unit 104cB. The language analysis result recording format converting unit 104cB generates a character string structure illustrated in FIG. 19(d), for each sentence included in a chapter, on the basis of information of each voice feature section from the voice feature detecting unit 104a and information of each sentence from the text converting unit 104b.

The character string structure includes an analysis information structure illustrated in FIG. 19(b). The analysis information structure has information of a "structure type", a "start time", and an "end time". In the analysis information structure that is included in the character string structure, the "structure type" shows that a structure is a character string structure, the start time shows a time when pronunciation of the character string starts, and the end time shows a time when the pronunciation of the character string ends.

The character string structure includes character string data (data of XXXXAAAAACCCCCCBBBBB in an example of FIG. 19(d)) of a sentence. The character string structure includes information of each voice feature section (split) in the sentence. Information of one voice feature section includes a start character position, a start time, and pronunciation information. The start character position shows a breakpoint position in the character string. The start character position is described in a form of what number position of the character string to make the character string and the voice feature section to correspond to each other. In the example of FIG. 19(d), a start character position in a voice feature section that corresponds to "AAAA" of the character string is a position of a fifth character.

The movement feature detecting unit 111 analyzes video data input to the video input unit 101 and detects a movement feature. In this case, the detected movement feature includes a focus position movement and an imaging direction change. The movement feature detecting unit 111 outputs a type of a movement feature and time information of a start and an end, for each movement feature section.

The movement analysis result recording format converting unit 112 generates a movement structure illustrated in FIG. 19(d), for each movement feature section, on the basis of the information of the movement feature section from the movement feature detecting unit 111. The movement structure includes the analysis information structure illustrated in FIG. 19(b) and the information of the "movement type" showing the type of the movement feature, for example, the focus position movement and the imaging direction change.

The analysis information structure has information of a "structure type", a "start time", and an "end time". In the analysis information structure included in the movement structure, the "structure type" shows that a structure is a movement structure, the start time shows a start time of the movement feature section, and the end time shows an end time of the movement feature section.

The analysis information integrating unit 113 integrates the character string structure generated by the language analysis result recording format converting unit 104cB of the language analyzing unit 104 and the movement structure generated by the movement analysis result recording format converting unit 112 and generates a content association structure illustrated in FIG. 19(a), for each chapter. An "ID to identify association content" is chapter identification information of the content. A character string structure of each sentence and a movement structure of each movement feature section are included in a portion of an "analysis information list".

The moving image/analysis information associating unit 106B associates the multiplexing data of the video data and the voice data obtained by the moving image multiplexing unit 103 and the content association structure obtained by the analysis information integrating unit 113 with each other and records the multiplexing data and the content association structure on the recording media 107. The other configuration and the operation of the information processing apparatus 10B illustrated in FIG. 18 are the same as the configuration and the operation of the information processing apparatus 10 illustrated in FIG. 1.

Figure 20:
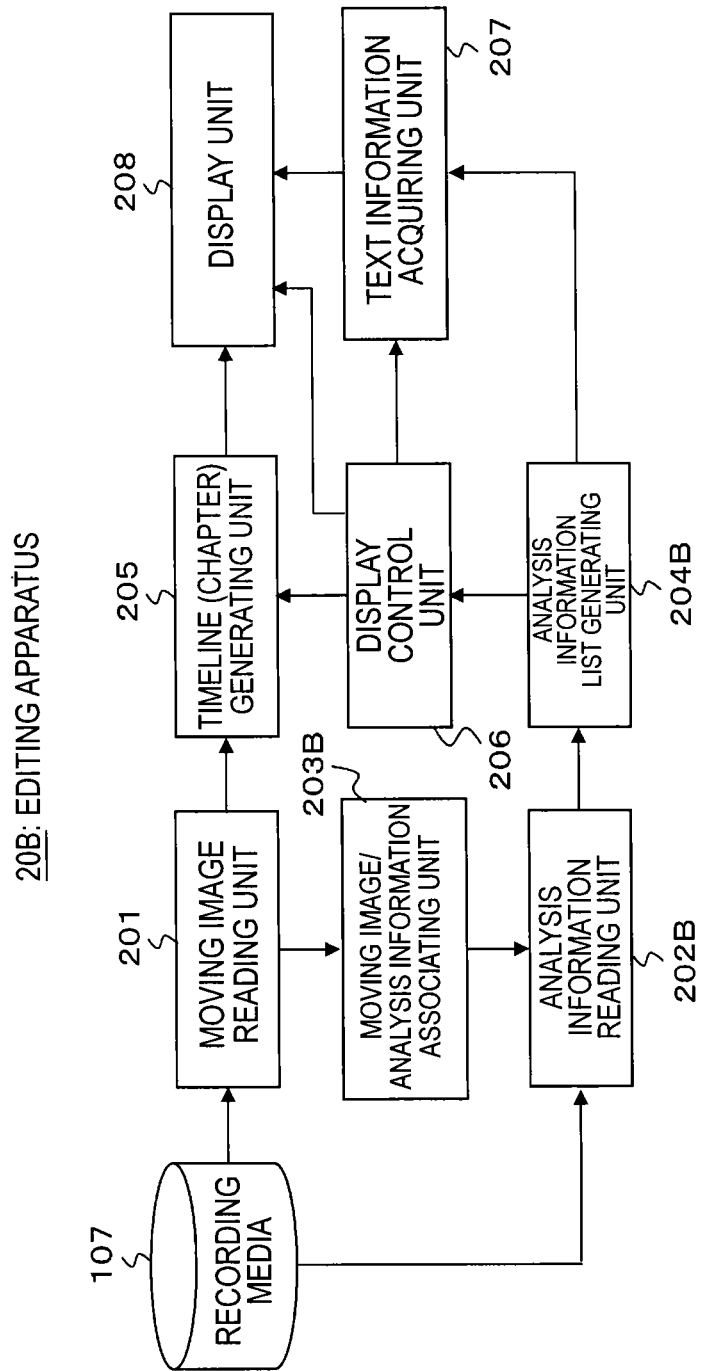
FIG. 20 is a block diagram illustrating another configuration example of an editing apparatus.

FIG. 20 illustrates a configuration example of an editing apparatus 20B. In FIG. 20, structural elements corresponding to the structural elements of FIG. 6 are denoted with the same reference numerals and detailed explanation thereof is omitted. The editing apparatus 20B handles the multiplexing data and the content association structure of each chapter recorded on the recording media 107 by the information processing apparatus 10B illustrated in FIG. 18.

The editing apparatus 20B includes a moving image reading unit 201, a language analysis information reading unit 202B, a moving image/analysis information associating unit 203B, and an analysis information list generating unit 204B. The editing apparatus 20B further includes a timeline (chapter) generating unit 205, a display control unit 206, a text information acquiring unit 207, and a display unit 208.

The analysis information reading unit 202B reads a content association structure (refer to FIG. 19) corresponding to the multiplexing data of the video data and the voice data of the predetermined chapter read by the moving image reading unit 201, from the recording media 107. At this time, the moving image/analysis information associating unit 203B transmits association information such as identification information or file information of the chapter to the analysis information reading unit 202A.

The analysis information list generating unit 204B receives the content association structure read by the analysis information reading unit 202B and generates an analysis information list. That is, in the analysis information list, the character string data, the start time, and the end time for each sentence included in the predetermined chapter are registered. In the analysis information list, the start character position, the start time, and the pronunciation information of each voice feature section (split) for each sentence are registered. In the analysis information list, the type information, the start time, and the end time for each movement feature section included in the predetermined chapter are registered.

In the analysis information list, a level of a useful degree of each voice feature section (split) is determined for each sentence and a section divided by the level of the useful degree, that is, a subchapter is registered. In the registration of the subchapter, identification information of the subchapter and information of a start position and an end position of the subchapter are associated with each other and are stored.

Figure 21:
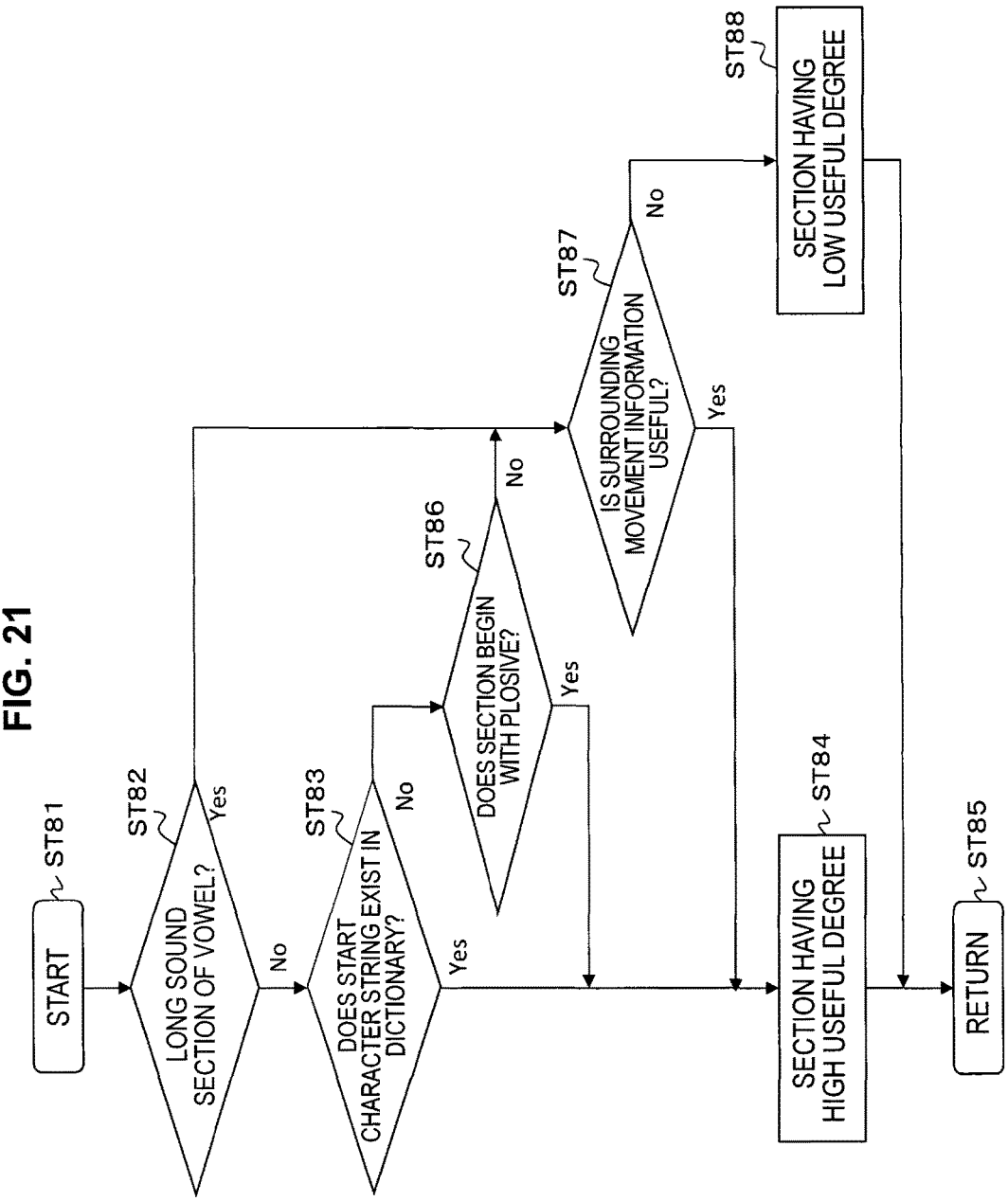
FIG. 21 is a flowchart illustrating another example of a processing sequence to determine a level of a useful degree of a sound feature section.

Similar to the editing apparatus 20 of FIG. 6, the processing of the subchapter registration for each sentence in the analysis information list generating unit 204B is executed according to the flowchart of FIG. 7. However, the section determination processing of step ST34 is executed using the movement analysis information as well as the language analysis information, as illustrated in a flowchart of FIG. 21, instead of the flowchart of FIG. 8.

In step ST81, the analysis information list generating unit 204B starts processing and then proceeds to step ST82. In step ST82, the analysis information list generating unit 204B determines whether a voice feature section of a processing object is the long sound section of the vowel.

When the voice feature section of the processing object is not the long sound section of the vowel, in step ST83, the analysis information list generating unit 204B determines whether a start character string of the voice feature section of the processing object exists in a dictionary. When the start character string exists in the dictionary, in step ST84, the analysis information list generating unit 204B determines the voice feature section of the processing object as a section having a high useful degree. Next, in step ST85, the analysis information list generating unit 204B ends the processing.

When it is determined in step ST83 that the start character string does not exist in the dictionary, in step ST86, the analysis information list generating unit 204B determines whether the voice feature section of the processing object is the section beginning with the plosive. When the voice feature section of the processing object is the section beginning with the plosive, in step ST84, the analysis information list generating unit 204B determines the voice feature section of the processing object as a section having a high useful degree. Next, in step ST85, the analysis information list generating unit 204B ends the processing.

When it is determined in step ST82 that the voice feature section of the processing object is the long sound section of the vowel or when it is determined in step ST86 that the voice feature section of the processing object is not the section beginning with the plosive, in step ST87, the analysis information list generating unit 204B determines whether surrounding movement information is useful. For example, when the movement feature section of the focus position movement or the imaging direction change exists in a surrounding portion, the analysis information list generating unit 204B determines that the surrounding movement information is useful.

When it is determined that the surrounding movement information is useful, in step ST84, the analysis information list generating unit 204B determines the voice feature section of the processing object as a section having a high useful degree. Then, in step ST85, the analysis information list generating unit 204B ends the processing. Meanwhile, when it is determined that the surrounding movement information is not useful, in step ST87, the analysis information list generating unit 204B determines the voice feature section of the processing object as a section having a low useful degree. Then, in step S85, the analysis information list generating unit 204B ends the processing.

Returning to FIG. 20, the timeline generating unit 205 generates the timelines of the video data and the voice data of the predetermined chapter relating to the editing read by the moving image reading unit 201. The timelines are generated under the control from the display control unit 206. The display control unit 206 controls an operation of the timeline generating unit 205, such that the timelines are generated in a state in which the section having the high useful degree and the section having the low useful degree can be distinguished, on the basis of the subchapters registered in the analysis information list.

The text information acquiring unit 207 acquires the character string data displayed to correspond to the timelines, on the basis of the analysis information list. The acquisition of the text information is performed under the control from the display control unit 206. The display control unit 206 controls an operation of the text information acquiring unit 207, such that the character string data corresponding to the voices of the predetermined subchapter section and the subchapter sections before and after the predetermined subchapter section is acquired, on the basis of the selection information of the predetermined subchapter section of the timeline from the user. The user selects the predetermined subchapter section by operating a pointing device such as a mouse (not illustrated in the drawings).

The display unit 208 is configured using a display such as a liquid crystal display (LCD) and displays an editing screen. The display unit 208 displays the timeline generated by the timeline generating unit 205 and the character string acquired by the text information acquiring unit 207, under the control from the display control unit 206. The other configuration and the operation of the editing apparatus 20B illustrated in FIG. 20 are the same as the configuration and the operation of the editing apparatus 20 illustrated in FIG. 6.

[Reproduction Control Based on Content Association Structure]

In the embodiment described above, the example of the case in which the display control of the editing screen is performed for each chapter, on the basis of the information included in the content association structure associated with the multiplexing data of the video data and the voice data, has been described. However, a method of performing control at the time of the highlight reproduction of the content, on the basis of the content association structure, is also considered. For example, the section that is determined as the section having the low useful degree on the basis of the content association structure may be previously excluded as an unnecessary section. Therefore, a highlight scene can be efficiently detected.

[Computer to which Present Disclosure is Applied]

The series of processes in the information processing apparatus and the editing apparatus described above can be executed by hardware or can be executed by software. In the case in which the series of processes is executed by the software, a program configuring the software is installed in a general-purpose computer.

Figure 22:
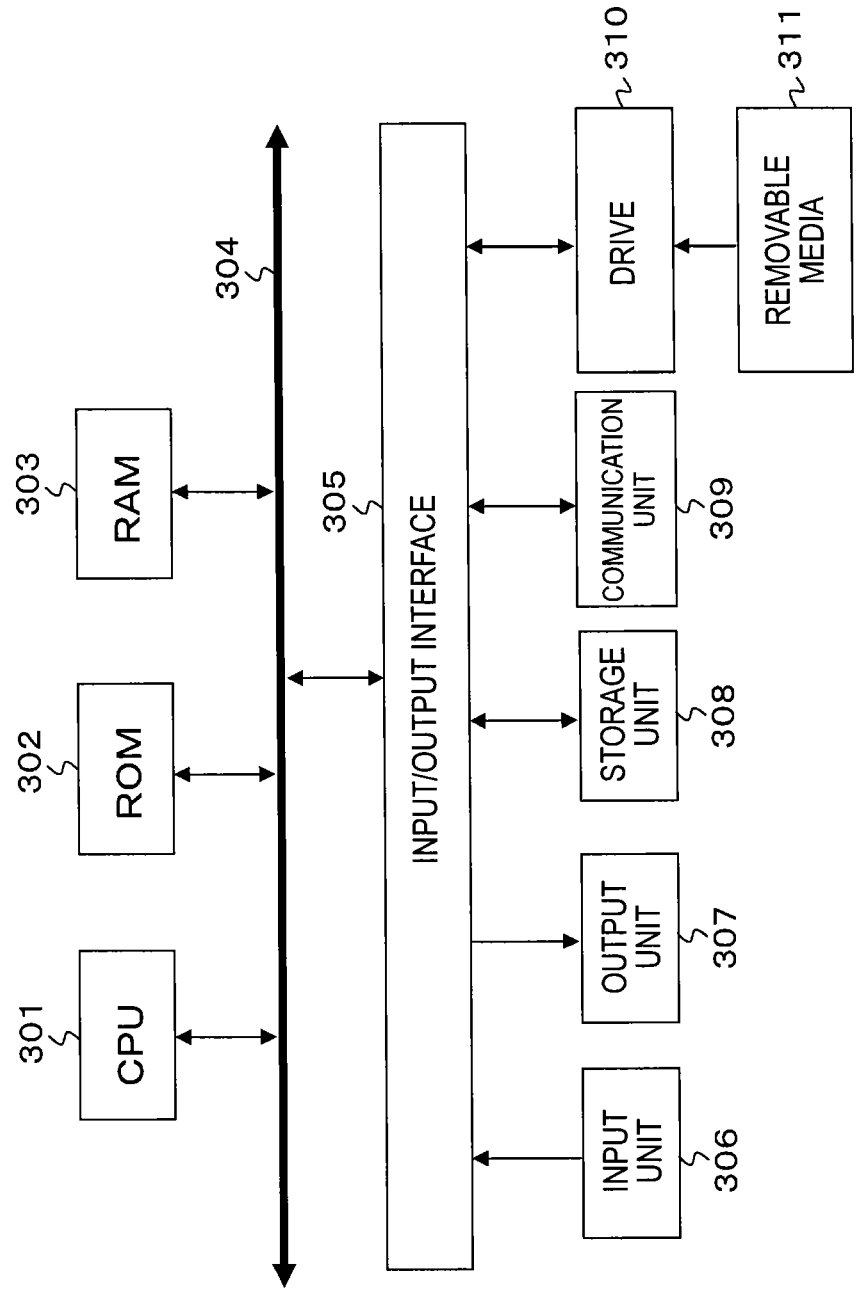
FIG. 22 is a diagram illustrating a configuration example of a computer.

FIG. 22 illustrates a configuration example of the computer in which the program executing the series of processes is installed. The program can be previously recorded in a storage unit 308 or a read only memory (ROM) 302 functioning as recording media embedded in the computer.

The program can be stored (recorded) in removable media 311. The removable media 311 can be provided as so-called package software. In this case, a flexible disc, a compact disc read only memory (CD-ROM), a magneto-optical (MO) disc, a digital versatile disc (DVD), a magnetic disc, and a semiconductor memory are exemplified as the removable media 311.

The program can be installed from the removable media 311 to the computer through a drive 310. In addition, the program can be downloaded to the computer through a communication network or a broadcasting network and can be installed in the embedded storage unit 308. That is, the program can be transmitted by wireless, from a download site to the computer through an artificial satellite for digital satellite broadcasting, or can be transmitted by wire, from the download site to the computer through a network such as a local area network (LAN) or the Internet.

The computer has a central processing unit (CPU) 301 embedded therein and an input/output interface 305 is connected to the CPU 301 through a bus 304. If a command is input through the input/output interface 305 by operating an input unit 306 by a user, the CPU 301 executes the program stored in the ROM 302, according to the command. The CPU 301 loads the program stored in the storage unit 308 to a random access memory (RAM) 303 and executes the program.

Thereby, the CPU 301 executes the processing according to the flowchart described above or the processing performed by the configuration of the block diagram described above. In addition, the CPU 301 outputs the processing result from an output unit 307, transmits the processing result from a communication unit 309, or records the processing result in the storage unit 308, through the input/output interface 305, according to necessity. The input unit 306 is configured using a keyboard, a mouse, and a microphone. The output unit 307 is configured using a liquid crystal display (LCD) and a speaker.

In the present disclosure, the processing executed by the computer according to the program is not necessarily executed in chronological order according to the order described as the flowchart. That is, the processing executed by the computer according to the program includes processing executed in parallel or individually (for example, parallel processing or processing based on an object). The program may be processed by one computer (processor) or may be distributed to and processed by a plurality of computers. Alternatively, the program may be transmitted to a remote computer and may be executed by the remote computer.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
an information acquiring unit that acquires information to identify an editing point of content including a voice, on the basis of language analysis of the content; and
an information output unit that outputs the acquired information.

(2) The information processing apparatus according to (1), wherein the information to identify the editing point includes language information obtained by the language analysis in a surrounding section of the editing point.

(3) The information processing apparatus according to (2), wherein the language information includes pronunciation information of the voice.

(4) The information processing apparatus according to (2) or (3),
wherein the language information includes character string information of the voice.

(5) The information processing apparatus according to any one of (1) to (4),
wherein the information output unit further outputs movement information of video included in the content, in a surrounding section of the editing point.

(6) The information processing apparatus according to any one of (1) to (5),
wherein the information output unit records the acquired information on a recording medium in association with the content.

(7) The information processing apparatus according to any one of (1) to (5),
wherein the information output unit transmits the acquired information to a network in a transmission unit of the content.

(8) An information processing method including:
acquiring information to identify an editing point of content including a voice, on the basis of language analysis of the content; and
outputting the acquired information.

(9) A display control apparatus including:
an information acquiring unit that acquires information to identify an editing point of content including a voice, is the editing point being obtained on the basis of language analysis of the content; and
a display control unit that controls display relating to the content, on the basis of the acquired information.
(10) The display control apparatus according to (9),
wherein the information to identify the editing point includes language information obtained by the language analysis in a surrounding section of the editing point.
(11) The display control apparatus according to (9) or (10),
wherein the display control unit identifies a first section of the content having a high useful degree and a second section of the content having a low useful degree, on the basis of the information to identify the editing point, and
wherein the display control unit performs control in a manner that a timeline of the content is displayed in a state in which the first section and the second section are distinguishable.
(12) The display control apparatus according to (11),
wherein the display control unit performs control in a manner that a character string corresponding to a voice of a predetermined section of the timeline is displayed, using character string information included in the language information, according to selection of the predetermined section of the timeline.
(13) The display control apparatus according to (12),
wherein the display control unit performs control in a manner that the character string corresponding to the voice of the predetermined section and character strings corresponding to voices of sections before and after the predetermined section are displayed and the character string corresponding to the voice of the predetermined section is highlighted and displayed.
(14) The display control apparatus according to (13),
wherein the highlight display has display colors different from display colors of other sections.
(15) The display control apparatus according to (10),
wherein the display control unit performs control in a manner that a timeline of the content divided by a section for a clause shown by character string information included in the language information is displayed and a character string corresponding to a voice of each section of the timeline is displayed to correspond to the section of the timeline.
(16) A display control method including:
acquiring information to identify an editing point of content including a voice, the editing point being obtained on the basis of language analysis of the content; and
controlling display relating to the content, on the basis of the acquired information.

The present disclosure contains subject matter related to that disclosed in Japanese Priority Patent Application JP 2012-156201 filed in the Japan Patent Office on Jul. 12, 2012, the entire content of which is hereby incorporated by reference.

What is claimed is:
1. An information processing apparatus, comprising:
one or more processors configured to:
identify voice data in a content by determining a voice start and a voice breakpoint in audio data;
analyze language of the voice data to generate character string data corresponding to the voice data;
split the character string data into one or more voice feature sections;
detect one or more movement feature sections from video data in the content;
determine usefulness of a voice feature section, for identifying an editing point of the content, based on one of a long sound section of a vowel, a section beginning with a plosive or a strong accent, an expression section of an imitative sound, or a change section of a pitch of the voice data;
determine usefulness of movement feature sections corresponding to the voice feature section in case that the determined usefulness of the voice feature section is low; and
control an output of information to identify the editing point of the content based on the one or more voice feature sections.

2. The information processing apparatus according to claim 1, wherein the information to identify the editing point is based on the one or more voice feature sections.

3. The information processing apparatus according to claim 1, wherein each of the one or more voice feature sections includes only one voice feature type.

4. The information processing apparatus according to claim 1, wherein the one or more processors are further configured to divide each of the one or more voice feature sections based on the determination of usefulness.

5. The information processing apparatus according to claim 1, wherein the one or more processors are further configured to control a display of movement information of the video data included in the content, in a surrounding section of the editing point.

6. The information processing apparatus according to claim 1, wherein the one or more processors are further configured to control the output of the information on a recording medium in association with the content.

7. The information processing apparatus according to claim 1, wherein the one or more processors are further configured to control the output of the information by transmitting the information via a network.

8. The information processing apparatus according to claim 1, wherein the one or more processors are further configured to control a display of the information to identify the editing point of the content based on the one or more voice feature sections.

9. The information processing apparatus according to claim 8, wherein the one or more processors are further configured to:
identify a first voice feature section of the content having a high degree of usefulness and a second voice feature section of the content having a low degree of usefulness, on the basis of voice feature type obtained from the language analysis of the first voice feature section and the second voice feature section; and
control the display in a manner that a timeline of the one or more voice feature sections is displayed in a state in which the first voice feature section and the second voice feature section are distinguishable based on their degrees of usefulness.

10. The information processing apparatus according to claim 9,
wherein the one or more processors are further configured to control the display to display a first character string data corresponding to the voice data of a determined section of the timeline according to a selection of the determined section of the timeline.

11. The information processing apparatus according to claim 10, wherein the one or more processors are further configured to control the display to display a second character string data corresponding to the voice data of other sections, before and after the determined section, wherein the first character string data corresponding to the voice data of the determined section is highlighted in the display.

12. The information processing apparatus according to claim 11, wherein the determined section highlighted in the display has display colors different from display colors of the other sections.

13. The information processing apparatus according to claim 9, wherein the one or more processors are further configured to:

identify degree of usefulness for each of the one or more voice feature sections; and control the display of the timeline of the one or more voice feature sections to indicate the degree of usefulness for each of the one or more voice feature sections.

14. The information processing apparatus according to claim 8, wherein the one or more processors are further configured to control the display in a manner that a timeline of the content is displayed to show a character string data corresponding to a clause of the voice data, wherein the character string data corresponding to the clause of the voice data is divided according to voice feature sections of the clause of the voice data.

15. The information processing apparatus according to claim 8, wherein the one or more processors are further configured to control the display in a manner that a timeline of the voice data is displayed, and the timeline of the voice data is divided along the timeline according to the one or more voice feature sections.

16. An information processing method, implemented by one or more processors, comprising:

identifying voice data in a content by determining a voice start and a voice breakpoint in audio data;

analyzing language of the voice data to generate character string data corresponding to the voice data;

splitting the character string data into one or more voice features sections;

detecting one or more movement feature sections from video data in the content;

determining usefulness of a voice feature section, for identifying an editing point of the content, based on one of a long sound section of a vowel, a section beginning with a plosive or a strong accent, an expression section of an imitative sound, or a change section of a pitch of the voice data;

determining usefulness of movement feature sections corresponding to the voice feature section in case that the determined usefulness of the voice feature section is low; and controlling an output of information to identify the editing point of the content based on the one or more voice feature sections.

17. The information processing method according to claim 16, wherein each of the one or more voice feature sections includes only one voice feature type.

\* \* \* \* \*